(12) United States Patent
Tani et al.

(10) Patent No.: US 9,180,619 B2
(45) Date of Patent: Nov. 10, 2015

(54) METHOD FOR PRODUCING DUCT-INTEGRATED FLOOR-RAISING MATERIAL

(75) Inventors: Naoto Tani, Aichi (JP); Takafumi Funato, Kanagawa (JP); Ryuichi Ishida, Tokyo (JP); Teruo Tamada, Kanagawa (JP)

(73) Assignee: KYORAKU CO., LTD., Tokyo (JP)

( * ) Notice: Subject to any disclaimer, the term of this patent is extended or adjusted under 35 U.S.C. 154(b) by 28 days.

(21) Appl. No.: 14/129,898

(22) PCT Filed: Jun. 29, 2012

(86) PCT No.: PCT/JP2012/004261
§ 371 (c)(1),
(2), (4) Date: Dec. 27, 2013

(87) PCT Pub. No.: WO2013/001842
PCT Pub. Date: Jan. 3, 2013

(65) Prior Publication Data
US 2014/0124989 A1    May 8, 2014

(30) Foreign Application Priority Data

| | | |
|---|---|---|
| Jun. 29, 2011 | (JP) | 2011-144962 |
| Jun. 29, 2011 | (JP) | 2011-144982 |
| Jun. 30, 2011 | (JP) | 2011-146144 |
| Jun. 30, 2011 | (JP) | 2011-146185 |
| Jun. 30, 2011 | (JP) | 2011-146404 |
| Jun. 30, 2011 | (JP) | 2011-146826 |

(51) Int. Cl.
*B29C 49/04* (2006.01)
*B29C 49/00* (2006.01)
*B29L 31/30* (2006.01)
*B29C 49/48* (2006.01)
*B29C 49/60* (2006.01)

(52) U.S. Cl.
CPC ............... *B29C 49/04* (2013.01); *B29C 49/00* (2013.01); *B29C 49/0031* (2013.01); *B29C 2049/4805* (2013.01); *B29C 2049/4812* (2013.01); *B29C 2049/6072* (2013.01); *B29L 2031/3002* (2013.01); *B29L 2031/3005* (2013.01); *B29L 2031/3017* (2013.01)

(58) Field of Classification Search
None
See application file for complete search history.

(56) References Cited

U.S. PATENT DOCUMENTS 4,762,379 A  *  8/1988  Beam et al. .............. 312/348.6

FOREIGN PATENT DOCUMENTS

| | | |
|---|---|---|
| JP | S54-40869 A | 3/1979 |
| JP | H01-128822 A | 5/1989 |

(Continued)

OTHER PUBLICATIONS

International Search Report, dated Aug. 21, 2012, which issued during the prosecution of International Patent Application No. PCT/JP2012/004261.

*Primary Examiner* — Monica Huson
(74) *Attorney, Agent, or Firm* — Troutman Sanders LLP

(57) ABSTRACT

A method for producing a duct-integrated floor-raising material includes the steps of: forming a first enclosed space, a second enclosed space, and a third enclosed space, having a molten tubular parison pressed flat and extruded from pinch-off portions by a pair of split molds, wherein portions of the parison corresponding to the pinch-off portions are welded to each other; molding the first hollow portion, the second hollow portion, the duct portion, and the waste bag in which a blow pin is pierced to outer surfaces of the tubular parison corresponding to the spaces, a pressurized fluid is blown to expand the parison, and the tubular parison is pressed against the surfaces of the split molds for shaping the parison; and cutting the waste bag to form an air intake port or an air outlet port on the duct portion.

18 Claims, 17 Drawing Sheets

(56) References Cited

FOREIGN PATENT DOCUMENTS

| JP | H09-207207 | A | 8/1997 |
| JP | H11-321287 | A | 11/1999 |
| JP | 2005-193428 | A | 7/2005 |
| JP | 2005-306309 | A | 11/2005 |
| JP | 2008-179096 | A | 8/2008 |
| JP | 2010-030553 | A | 2/2010 |
| JP | 4462924 | B2 | 2/2010 |

* cited by examiner

FIG. 7
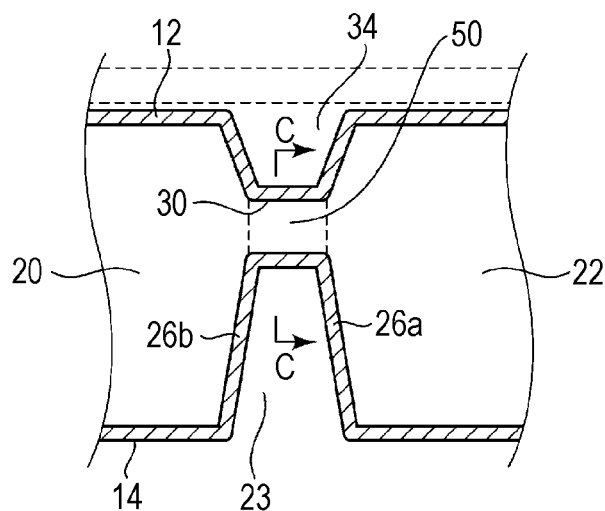
(A)
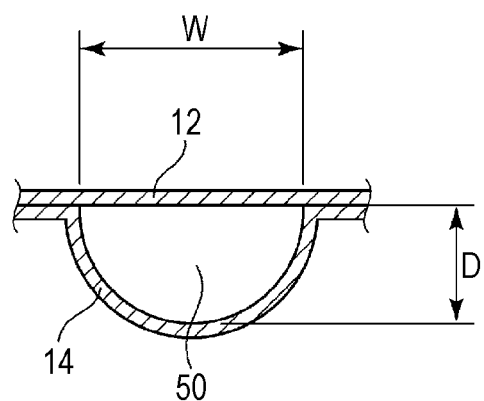
(B)

METHOD FOR PRODUCING DUCT-INTEGRATED FLOOR-RAISING MATERIAL

CROSS-REFERENCE TO RELATED APPLICATIONS

This is a U.S. national phase application under 35 U.S.C. §371 of International Patent Application No. PCT/JP2012/004261, filed on Jun. 29, 2012, and claims benefit of priority to Japanese Patent Application Nos. 2011-144962 filed Jun. 29, 2011, 2011-144982 filed Jun. 29, 2011, 2011-146144 filed Jun. 30, 2011, 2011-146185 filed Jun. 30, 2011, 2011-146826 filed Jun. 30, 2011, and 2011-146404 filed Jun. 30, 2011. The International Application was published on Jan. 3, 2013 as International Publication No. WO2013/001842 under PCT Article 21(2). The entire contents of these applications are hereby incorporated by reference.

TECHNICAL FIELD

The present invention relates to a method for producing a duct-integrated floor-raising material. More specifically, the present invention relates to a method for producing a duct-integrated floor-raising material that can efficiently manufacture a duct-integrated floor-raising material while maintaining the performance or the quality of a duct.

BACKGROUND ART

Heretofore, a resin duct-integrated floor-raising material is used for adjusting the height of the floor surface of an automobile.

The resin vehicle floor-raising material is in a nearly rectangular panel shape in a predetermined thickness (height) according to the specifications. The raising material is demanded to reduce the weight, and is disposed on the floor pan of the automobile, mainly on the foot of a driver seat. Moreover, since the raising material is demanded to have stiffness, particularly compressed stiffness in that the driver's feet are placed on the top surface, an integrated hollow structure body is adopted in which a rib is disposed in the integrated hollow structure body to extend between a top sidewall and a back sidewall for joining the two walls.

Since such a floor-raising material is a resin integrated hollow structure body, a method for molding the floor-raising material is blow molding, which is more technically advantageous than injection molding. For example, Patent Document 1 discloses a method for producing an automobile floor-raising material by blow molding.

The method for producing an automobile floor-raising material is a method for blow-molding a molten parison in split molds. The manufacture method generally includes the steps of opening the split molds, dropping the molten parison between the opened split molds, and clamping the split molds and blowing a pressurized fluid into the molten parison.

More specifically, the manufacture method is a method for producing an automobile floor-raising material in a hollow double wall structure including a front sidewall and a back sidewall opposite to each other as a gap is spaced. In the manufacture method, first, split molds are opened. The split molds are formed of two molds. One of the molds includes a rib forming portion protruding in a plate shape to form a plurality of groove ribs recessed in grooves on the front sidewall side of an automobile floor-raising material. The other mold includes a rib forming portion protruding in a nearly cone shape to form a plurality of cone ribs recessed in a nearly cone shape on the back sidewall side of the automobile floor-raising material. Subsequently, a molten parison is dropped between the split molds. The split molds are then clamped in such a way that the tip end portion of the rib forming portion of the one mold faces and comes close to the tip end portion of the rib forming portion of the other mold. Subsequently, a pressurized fluid is blown into the parison. Thus, the parison is expanded along a cavity in the split molds, and the groove rib is integrally welded to the cone shaped rib. Thus, the front sidewall is formed with a plurality of groove ribs recessed in grooves nearly in parallel with each other toward the back sidewall. On the other hand, the back sidewall is formed with the cone shaped ribs recessed in a nearly cone shape at positions opposite to the groove ribs toward the front sidewall side. As a result, the automobile floor-raising material is blow-molded in which the top walls of the cone shaped ribs and the tip end portions of the groove ribs integrally form welded portions.

Generally, an air duct is disposed near the foot of the driver seat in order to flow air-conditioned air from an air conditioner disposed on the front part of the automobile to the rear seat of the automobile. The air duct extends in the vehicle longitudinal direction across the adjacent edge portions of the resin vehicle floor-raising material disposed on the foot of the driver seat or across the opposite edge portions.

On this point, Patent Document 2, for example, discloses a duct-integrated floor-raising material in which an air duct and a floor-raising material are integrally formed in a module and the number of parts is reduced. This duct-integrated floor-raising material is made of a resin, and has a hollow double wall structure formed of a top sidewall and a back sidewall. Moreover, in the duct-integrated floor-raising material, a first recessed groove and a second recessed groove protruding from the back sidewall to the hollow portion side are integrally formed at a welded portion with respect to the top sidewall. Thus, a duct portion is disposed between the first recessed groove and the second recessed groove, and the duct portion includes an air channel separated from the hollow portion of the floor-raising material.

In the case where such a duct-integrated floor-raising material is integrally molded by blow molding as in Patent Document 1, a blow pin should be pierced into a molten parison for applying a blowing pressure, resulting in the following technical problems.

First, a defective product is produced depending on the position to pierce the blow pin.

More specifically, as discussed above, the duct extends in the vehicle longitudinal direction across the adjacent edge portions of the duct-integrated floor-raising material or the opposite edge portions. Thus, the duct-integrated floor-raising material is formed with three hollow portions partitioned from each other. One of the hollow portions is a duct forming an air channel. In the duct-integrated floor-raising material, the hollow portion is divided unequally as compared with a typical duct. Therefore, the divided hollow portions include a single large hollow portion, a single small hollow portion, and a duct forming an air channel and formed between the large hollow portion and the small hollow portion. In this case, the hollow portions other than the duct are not demanded to have strict-sealing properties as long as a predetermined stiffness is maintained. The reason is that even though the mark (a hole) of the blow pin is left and the sealing properties are not secured, originally, a carpet is laid on the top surface of the duct-integrated floor-raising material. Thus, the beauty of the appearance is not demanded, thereby securing the heights of the hollow portions, or the thickness of the floor-raising material.

However, the duct portion is an air conditioning air channel. Thus, when the mark (a hole) of the blow pin is left, air is leaked from the mark to cause a reduction in ventilation efficiency. With the reduction in ventilation efficiency, an unusual sound sometimes occurs from the floor surface in leaking air.

The duct portion may be separately molded (for example, the duct portion is blow-molded) and prepared as a molded component in order to maintain the performance or the quality of a duct. However, the floor-raising material is blow-molded without the duct portion, and the duct portion is later assembled. Thus, the manufacture efficiency of the floor-raising material can be degraded.

Secondly, since there are a larger number of blow pins, the circulation of blowing air is poor, which adversely affects the molding properties.

More specifically, in the case where blow pins are pierced to three hollow portions partitioned from each other for blow-molding, it is necessary to increase the number of blow pins to pierce according to the volumes of the hollow portions from the viewpoint of molding efficiency. However, on the contrary, an increased number of blow pins sometimes degrade the circulation of blowing air in the hollow portions. As a result, the molding properties of the molten parison molded by a blowing pressure are sometimes degraded.

Thirdly, the improvement of the sound insulation properties of the duct portion in which ventilating air flows is restricted.

More specifically, in order to improve the sound insulation properties of the duct portion, it is necessary to increase the volume of the hollow portion in the duct portion. However, in the case of the duct-integrated floor-raising material, the duct portion is disposed between the small hollow portion and the large hollow portion, and has a limitation on the expanse. On the other hand, it is inevitable to restrict the volume of the hollow portion in the duct portion of the duct-integrated floor-raising material. This is because the height of the duct portion is generally set lower than the heights of the small hollow portion and the large hollow portion because a driver, for example, steps on the top surface of the duct portion. Moreover, the duct portion between the small hollow portion and the large hollow portion is formed to be protected by the adjacent small hollow portion and the adjacent large hollow portion with stiffness. As a result, an air passing sound is sometimes noticeable, which comes from the duct portion of the duct-integrated floor-raising material disposed on the foot of the driver seat.

Fourthly, it is difficult to secure molding efficiency without impairing a weight reduction.

More specifically, in the case where blow pins are pierced to the large hollow portion, the small hollow portion, and the duct portion to mold the portions by blow molding, it is possible to achieve a weight reduction by individually forming hollow portions in the large hollow portion, the small hollow portion, and the duct portion. However, it is difficult to secure molding efficiency. In this case, a hollow portion should be disposed as an air channel in the duct portion. However, the large hollow portion or the small hollow portion may be entirely formed in a solid without blow molding because of no need to provide a hollow portion in the large hollow portion or the small hollow portion. However, when the large hollow portion or the small hollow portion is formed in a solid entirely, it does not considerably contribute to reducing the weight because the heights of the hollow portions are used for raising the floor.

Patent Document 1: Japanese Patent No. 4462924
Patent Document 2: JP-A-2010-30553

SUMMARY OF THE INVENTION

Problems to be Solved by the Invention

In view of the technical problems describe above, it is an object of the present invention to provide a method for producing a duct-integrated floor-raising material that can efficiently manufacture a duct-integrated floor-raising material while maintaining the performance or the quality of a duct.

In view of the technical problems describe above, it is an object of the present invention to provide a method for producing a duct-integrated floor-raising material that can efficiently manufacture a duct-integrated floor-raising material as excellent molding properties are secured while maintaining the performance or the quality of a duct including the sound insulation properties and the ventilation properties.

In view of the technical problems describe above, it is an object of the present invention to provide a method for producing a duct-integrated floor-raising material that can efficiently manufacture a duct-integrated floor-raising material as a weight reduction is secured while maintaining the performance or the quality of a duct.

Solutions to the Problems

To solve the above mentioned problems, a method for producing a duct-integrated floor-raising material in a hollow double wall structure in which a height between a top sidewall and a back sidewall is used for raising a floor and a first hollow portion, a second hollow portion, and a duct portion disposed between the hollow portions are disposed as partitioned from each other includes the steps of: preparing a pair of split molds individually disposed with a pinch-off portion around cavities of the split molds, the split molds being disposed as the cavities are opposite to each other, the split molds being relatively movable between a clamping position and an opening position, at least one of the cavities of the split molds being disposed, between the pinch-off portions, with a first projecting portion to form a first long groove protruding inwardly and partitioning the first hollow portion from the duct portion on a back sidewall of the floor-raising material and a second projecting portion to form a second long groove protruding inwardly and partitioning the second hollow portion from the duct portion on the back sidewall of the floor-raising material, at least one of the cavities of the molds being disposed with a recess to form a waste bag in communication with the duct portion on an outer side of the cavity corresponding to an end portion of the duct portion; disposing a molten tubular parison between the pair of the split molds at the opening position; forming a first enclosed space corresponding to the first hollow portion, a second enclosed space corresponding to the second hollow portion, and a third enclosed space corresponding to the duct portion and the waste bag in which the pair of the split molds at the opening position is relatively brought close to the clamping position, the pair of the split molds is moved to the clamping position so that tip end portions of the first projecting portion and the second projecting portion of one mold face the cavity of the other mold and are brought close to each other at a predetermined distance, the molten tubular parison is pressed flat and extruded from the pinch-off portions, and portions of the molten tubular parison corresponding to the pinch-off portions of the pair of the molds is welded to each other; molding the first hollow portion, the second hollow portion, the duct portion, and the waste bag in which a blow pin is individually pierced to outer surfaces of the tubular parison corresponding to the first enclosed space, the second enclosed space, and the waste bag, a pressurized fluid is blown to expand the molten tubular parison, the expanded molten tubular parison is pressed against surfaces of the cavities of the corresponding split molds, and the tubular parison is shaped; and cutting the waste bag to form an air intake port or an air outlet port on the duct portion.

In the present invention, a duct-integrated floor-raising material is in a nearly rectangular panel shape having a predetermined thickness (height) from the top surface of the floor pan on which the raising material is placed to the flat surface forming the floor surface because of a demand for the function. On the other hand, the air duct delivering air from the air conditioner disposed on the vehicle front part to the vehicle rear part extends on the floor-raising material in the vehicle longitudinal direction across the edge portions of the floor-raising material. With the use of the facts, the forms of piercing a blow pin acting on a blowing pressure to form a duct are considered. Thus, a duct-integrated floor-raising material is manufactured.

More specifically, according to the method for producing a duct-integrated floor-raising material in the configuration described above, the duct portion is formed with the waste bag on the duct end portion (on the air intake port side or the air outlet port side), a blow pin is pierced to the waste bag, and a blowing pressure is applied to the inside for shaping. Thus, the duct portion is molded. The waste bag is cut as burrs in the split molds or after taking out the molded component, and then the air intake port or the air outlet port is formed. Therefore, no marks (holes) of the blow pins are left on the portion to form the air channel. Thus, a reduction in ventilation efficiency can be prevented, and the occurrence of an unusual sound from the mark of the blow pin can be prevented as well. Thus, a floor-raising material can be efficiently manufactured integrally with a duct while maintaining the performance or the quality of a duct.

In addition, it is preferable that a waste bag is formed on end portions of the duct portion, a blow pin is pierced to the waste bags, and a pressurized fluid is blown into the third enclosed space corresponding to the duct portion.

Moreover, it is preferable that a blow pin is pierced to a portion of the waste bag corresponding to the pinch-off portion in clamping the integrated split molds.

Furthermore, it is preferable that the duct-integrated raising material includes a top sidewall, a back sidewall, and a peripheral sidewall between the top sidewall and the back sidewall in an integrated hollow double wall structure by blow molding in which a height of the peripheral sidewall is used for raising a floor; that the top sidewall or the back sidewall is disposed with the first long groove and the second long groove inwardly protruding from the top sidewall or the back sidewall and extending between adjacent peripheral sidewalls or opposite peripheral sidewalls as a predetermined gap is spaced; that the first long groove and the second long groove individually include opposite sidewalls protruding inwardly and a bottom wall formed between lower edges of the opposite sidewalls; that the bottom walls of the first long groove and the second long groove are welded to an inner surface of the back sidewall or the top sidewall; and that the duct portion forming an air channel in an inside of the duct portion with one of the opposite sidewalls of the first long groove, one of the opposite sidewalls of the second long groove adjacent to one of the sidewalls, the top sidewall, and the back sidewall is formed as partitioned from a hollow portion formed of the other of the opposite sidewalls of the first long groove or the second long groove, the top sidewall, the back sidewall, and the peripheral sidewall.

In addition, it is preferable that the hollow portion includes a small hollow portion formed of the other of the opposite sidewalls of the first long groove, the top sidewall, the back sidewall, and the peripheral sidewall, and includes a large hollow portion formed of the other of the opposite sidewalls of the second long groove, the top sidewall, the back sidewall, and the peripheral sidewall; and that the duct portion is disposed between the small hollow portion and the large hollow portion.

Moreover it is preferable that a number of blow pins to pierce for molding the small hollow portion is smaller than a number of blow pins to pierce for molding the large hollow portion.

Furthermore, it is preferable that a third projecting portion is disposed on the top sidewall of the cavity of the split mold opposite to at least one of the split molds, and the third projecting portion forms a groove rib protruding from the top sidewall to the hollow portion side, and that the bottom walls of the first long groove and the second long groove are welded to an inner surface of a bottom portion of the groove rib.

In addition, it is preferable that the step of disposing the in molten parison includes the step of extruding the molten parison from an extrusion slit disposed above the pair of the split molds; that the first projecting portion and the second projecting portion are disposed across the pinch-off portions in a nearly vertical direction on at least the one of the cavities of the split molds, and the duct portion is molded in an orientation in a nearly vertical direction; and that a blow pin to the waste bag below is pierced upwardly or horizontally, and a blow pin to the waste bag above is pierced horizontally.

Moreover, it is preferable that a blow pin to the hollow portion is pierced horizontally from an inside of a corresponding mold in an orientation nearly orthogonal to a surface of the cavity.

Furthermore, it is preferable that the supply port and the air outlet port of the duct portion are disposed at positions protruding outwardly from the peripheral sidewall.

In addition, it is further preferable that the first long groove, the second long groove, or the first long groove and the second long groove are in an inwardly tapered shape at a predetermined tapered angle; and that the predetermined tapered angle is determined according to a blow ratio of a bottom portion of the first long groove or the second long groove.

In addition, it is preferable that at least one of the cavities of the split molds is further disposed with a protrusion to form a recessed groove protruding inwardly on the back sidewall of the floor-raising material, and an annular rib is formed in the hollow portion to join the back sidewall to the top sidewall.

Moreover, it is preferable that the back sidewall is formed with an irregular portion to absorb irregularities of a floor pan on which the back sidewall is placed according to the irregularities; and that the top sidewall is formed in a flat surface.

To solve the above mentioned problems, in the present invention, a method for producing a duct-integrated floor-raising material in a hollow double wall structure in which a height between a top sidewall and a back sidewall is used for raising a floor, a small hollow portion, a large hollow portion, a duct portion between the hollow portions are disposed, the duct portion is in communication with the small hollow portion using a communicating passage, and the duct portion is partitioned from the large hollow portion includes the steps of: preparing a pair of split molds individually disposed with a pinch-off portion around cavities of the split molds, the split molds being disposed as the cavities are opposite to each other, the split molds being relatively movable between a clamping position and an opening position, at least one of the cavities of the split molds being disposed, between the pinch-off portions, with a first projecting portion to form a first long groove protruding inwardly and partitioning the small hollow portion from the duct portion on a back sidewall of the floor-raising material and a second projecting portion to form a second long groove protruding inwardly and partitioning the large hollow portion from the duct portion on the back sidewall of the floor-raising material, a tip end portion of the first projecting portion being disposed with a recess to form the communicating passage in a thickness direction of the first projecting portion, at least one of the cavities of the molds being disposed with a recess to form a waste bag in communication with the duct portion on an outer side of the cavity corresponding to an end portion of the duct portion; disposing a molten tubular parison between the pair of the split molds at the opening position; forming a second enclosed space corresponding to the large hollow portion, a third enclosed space corresponding to the duct portion and the waste bag, and a first enclosed space corresponding to the small hollow portion in communication with the third enclosed space and the recess in which the pair of the split molds at the opening position is relatively brought close to the clamping position, the pair of the split molds is moved to the clamping position so that tip end portions of the first projecting portion and the second projecting portion of one mold face the cavity of the other mold and are brought close to each other at a predetermined distance, the molten tubular parison is pressed flat and extruded from the pinch-off portions, and portions of the molten tubular parison corresponding to the pinch-off portions of the pair of the molds is welded to each other; molding the large hollow portion, the duct portion, and the waste bag and molding the small hollow portion through the communicating passage in which a blow pin is individually pierced to outer surfaces of the tubular parison corresponding to the second enclosed space and the waste bag, a pressurized fluid is blown to expand the molten tubular parison, the expanded molten tubular parison is pressed against surfaces of the cavities of the corresponding split molds, and the tubular parison is shaped; and cutting the waste bag to form an air intake port or an air outlet port on the duct portion.

In the present invention, a duct-integrated floor-raising material is in a nearly rectangular panel shape having a predetermined thickness (height) because of a demand for the function. On the other hand, the air duct delivering air from the air conditioner disposed on the vehicle front part to the vehicle rear part extends on the floor-raising material in the vehicle longitudinal direction across the edge portions of the floor-raising material. With the use of the facts, the forms of piercing a blow pin acting on a blowing pressure to form a duct are considered. Thus, a duct-integrated floor-raising material is manufactured.

More specifically, according to the method for producing a duct-integrated floor-raising material in the configuration described above, for the large hollow portion, a blow pin is pierced to the outer surface of the tubular parison corresponding to the large hollow portion, and a blowing pressure is applied to the inside for shaping. On the other hand, the duct portion is formed with the waste bag on the duct end portion (on the air intake port side or the air outlet port side). A blow pin is pierced to the waste bag, and a blowing pressure is applied to the inside for shaping. Thus, the duct portion is molded. The waste bag is cut as burrs in the split molds or after taking out the molded component, and then the air intake port or the air outlet port is formed. Therefore, no marks (holes) of the blow pins are left on the portion to form the air channel. Thus, a reduction in ventilation efficiency can be prevented, and the occurrence of an unusual sound from the mark of the blow pin can be prevented as well.

Moreover, blowing air from the duct portion is delivered to the small hollow portion through the communicating passage. Thus, the number of blow pins to pierce is reduced on the overall duct-integrated floor-raising material. Thus, the degradation of the circulation of blowing air can be prevented, and excellent molding properties can be secured. In addition, the volume of the hollow portion in the duct portion is increased by communicating the duct portion with the small hollow portion using the communicating passage. It is also possible to reduce a passing sound of ventilating air passing through the duct portion because of an increase in the volume of the hollow portion. Thus, a floor-raising material can be efficiently manufactured integrally with a duct as excellent molding properties are secured while maintaining the performance or the quality of a duct including the sound insulation properties and the ventilation properties.

In addition, it is preferable that the duct-integrated raising material includes a top sidewall, a back sidewall, and a peripheral sidewall between the top sidewall and the back sidewall in an integrated hollow double wall structure by blow molding in which a height of the peripheral sidewall is used for raising a floor; that the back sidewall is disposed with the first long groove and the second long groove inwardly protruding from the back sidewalls and extending between adjacent peripheral sidewalls or opposite peripheral sidewalls as a predetermined gap is spaced; that the first long groove and the second long groove individually include opposite sidewalls protruding inwardly and a bottom wall formed between lower edges of the opposite sidewalls; and that the bottom walls of the first long groove and the second long groove are welded to an inner surface of the top sidewall, and the duct portion forming an air channel in an inside of the duct portion with one of the opposite sidewalls of the first long groove, one of the opposite sidewalls of the second long groove adjacent to one of the sidewalls, the top sidewall, and the back sidewall is formed as partitioned from a hollow portion formed of the other of the opposite sidewalls of the first long groove or the second long groove, the top sidewall, the back sidewall, and the peripheral sidewall.

Moreover, it is preferable that the hollow portion includes a small hollow portion formed of the other of the opposite sidewalls of the first long groove, the top sidewall, the back sidewall, and the peripheral sidewall and includes a large hollow portion formed of the other of the opposite sidewalls of the second long groove, the top sidewall, the back sidewall, and the peripheral sidewall; that the duct portion is disposed between the small hollow portion and the large hollow portion; and that the bottom wall of the first long groove is formed with the communicating passage communicating between the opposite sidewalls.

It is preferable that the recess to form the communicating passage is in a semicircular shape having a radius of 2 to 10 mm.

It is further preferable that the recess to form the communicating passage is formed in a groove that a tip end portion of the first projecting portion is notched.

To solve the above mentioned problems, in the present invention, a method for producing a duct-integrated floor-raising material in a hollow double wall structure in which a height between a top sidewall and a back sidewall is used for raising a floor, a hollow portion and a duct portion are disposed as partitioned from each other, and the duct portion is disposed with a solid wave portion at almost a same level as a level of the hollow portion on an opposite side of the hollow portion on a top sidewall includes the steps of: preparing a pair of split molds individually disposed with a pinch-off portion around cavities of the split molds, the split molds being disposed as the cavities are opposite to each other, the split molds being relatively movable between a clamping position and an opening position, at least one of the cavities of the split molds being disposed, between the pinch-off portions, with a first projecting portion to form a first long groove protruding inwardly and partitioning the hollow portion from the duct portion on a back sidewall and a second projecting portion to form a second long groove protruding inwardly and hermetically sealing the duct portion, the pair of the split molds being individually disposed with a protrusion to form the solid wave portion on the duct portion on the opposite side of the hollow portion, the protrusion being in an alternately complementary shape having the second projecting portion as a single protrusion, at least one of the cavities of the molds being disposed with a recess to form a waste bag in communication with the duct portion on an outer side of the cavity corresponding to an end portion of the duct portion; disposing a molten tubular parison between the pair of the split molds at the opening position; forming a first enclosed space corresponding to the hollow portion and the waste bag in which the pair of the split molds at the opening position is relatively brought close to the clamping position, the pair of the split molds is moved to the clamping position so that a tip end portion of the first projecting portion of one mold faces the cavity of the other mold and is brought close to the cavity of the other mold at a predetermined distance, the molten tubular parison is pressed flat and extruded from the pinch-off portions, and two wall surfaces of the tubular parison are integrally welded to each other by clamping the molten tubular parison between the pair of the split molds while welding portions of the molten tubular parison corresponding to the pinch-off portions of the pair of the molds to each other to avoid formation of a substantial hollow portion on the solid wave portion; molding the hollow portion, the duct portion, and the waste bag in which a blow pin is individually pierced to outer surfaces of the tubular parison corresponding to the first enclosed space and the waste bag, a pressurized fluid is blown to expand the molten tubular parison, the expanded molten tubular parison is pressed against surfaces of the cavities of the corresponding split molds, and the tubular parison is shaped; and cutting the waste bag to form an air intake port or an air outlet port on the duct portion.

In the present invention, a duct-integrated floor-raising material is in a nearly rectangular panel shape having a predetermined thickness (height) between the floor surface and the top surface of the floor pan on which the raising material is placed due to a demand for the function. On the other hand, the air duct delivering air from the air conditioner disposed on the vehicle front part to the vehicle rear part extends on the floor-raising material in the vehicle longitudinal direction across the edge portions of the floor-raising material. With the use of the facts, the forms of piercing a blow pin acting on a blowing pressure to form a duct are considered. Thus, a duct-integrated floor-raising material is manufactured.

More specifically, according to the method for producing a duct-integrated floor-raising material in the configuration described above, for the large hollow portion, a blow pin is pierced to the outer surface of the tubular parison corresponding to the large hollow portion, and a blowing pressure is applied to the inside for shaping. On the other hand, the duct portion is formed with the waste bag on the duct end portion (on the air intake port side or the air outlet port side). A blow pin is pierced to the waste bag, and a blowing pressure is applied to the inside for shaping. Thus, the duct portion is molded. The waste bag is cut as burrs in the split molds or after taking out the molded component, and then the air intake port or the air outlet port is formed. Therefore, no marks (holes) of the blow pins are left on the portion to form the air channel. Thus, a reduction in ventilation efficiency can be prevented, and the occurrence of an unusual sound from the mark of the blow pin can be prevented as well.

Moreover, the portion, which is a small hollow portion in the previously existing techniques, occupies a small area in the hollow portion and has a small influence on the overall raising material. Thus, for the portion, which is a small hollow portion in the previously existing techniques, compression is used in clamping the split molds for blow-molding the large hollow portion and the duct portion. In the blow molding, two wall surfaces of the tubular parison are integrally welded to each other in such a way that the height of a wave exerting the floor-raising function is formed and a substantial hollow portion is not formed. Thus, the portion, which is a small hollow portion in the previously existing techniques, can be completed as the solid wave portion. Thus, a duct-integrated floor-raising material can be efficiently manufactured as a weight reduction is secured while maintaining the performance or the quality of a duct.

Moreover, it is preferable that the duct-integrated raising material includes a top sidewall, a back sidewall, and a peripheral sidewall between the top sidewall and the back sidewall in an integrated hollow double wall structure by blow molding in which a height of the peripheral sidewall is used for raising a floor; that the top sidewall or the back sidewall is disposed with the first long groove and the second long groove inwardly protruding from the top sidewall or the back sidewall and extending between adjacent peripheral sidewalls or opposite peripheral sidewalls as a predetermined gap is spaced; that the first long groove and the second long groove individually include opposite sidewalls protruding inwardly and a bottom wall formed between lower edges of the opposite sidewalls; and that the bottom walls of the first long groove and the second long groove are welded to an inner surface of the back sidewall or the top sidewall, and the duct portion forming an air channel in an inside of the duct portion with one of the opposite sidewalls of the first long groove, one of the opposite sidewalls of the second long groove adjacent to one of the sidewalls, the top sidewall, and the back sidewall is formed as partitioned from a hollow portion formed of the other of the opposite sidewalls of the first long groove, the top sidewall, the back sidewall, and the peripheral sidewall.

In addition, it is preferable that the back sidewall is formed with an irregular portion to absorb irregularities of a floor pan on which the back sidewall is placed according to the irregularities; that a height of a wave of the solid wave portion is varied according to the irregularities of the floor pan on which the back sidewall side of the solid wave portion is placed; and that the top sidewall and the top sidewall side of the solid wave portion are formed in a flat surface.

BEST MODE FOR CARRYING OUT THE INVENTION

In the following, a first embodiment of a method for producing a duct-integrated floor-raising material 10 according to the present invention will be described in detail with reference to the drawings. In the following, a description will be given as the duct-integrated floor-raising material 10 disposed on the foot of the driver seat of an automobile is taken as an example.

As depicted in FIG. 1, the duct-integrated floor-raising material 10 is disposed between a floor pan and a carpet C on the foot of a driver seat S of an automobile V. The thickness of the duct-integrated floor-raising material 10 is defined so as to satisfy the demanded level of the floor surface of the carpet C regardless of the irregularities of the floor pan.

More specifically, the duct-integrated floor-raising material 10 is disposed and used across a front sidewall surface below the dashboard of the automobile V and a recess on the floor surface continuing to the front sidewall surface. Therefore, the duct-integrated floor-raising material 10 integrally includes a raising portion 2 corresponding to the recess on the floor surface and a foot rest portion 3 corresponding to the front sidewall surface below the dashboard.

The duct-integrated floor-raising material 10 is a member that allows the floor frame of an old model to be used as it is in changing models, for example. Therefore, the duct-integrated floor-raising material 10 is demanded to reduce the weight. Moreover, the duct-integrated floor-raising material 10 is disposed on the floor pan F of the automobile V, mainly on the foot of the driver seat S, and is demanded to have stiffness, particularly compressed stiffness because the driver's feet are placed on the top surface.

As depicted in FIG. 2, the duct-integrated floor-raising material 10 is in a nearly rectangular panel shape having a predetermined thickness (height). Here, a predetermined thickness (height) is a thickness (height) from the top surface of the floor pan F on which the raising material is placed to a flat surface forming the floor surface. The duct-integrated floor-raising material 10 includes a top sidewall 12, a back sidewall 14, and a peripheral sidewall 16 between the top sidewall 12 and the back sidewall 14. The duct-integrated floor-raising material 10 has a hollow double wall structure in which the height of the peripheral sidewall 16 is used for raising the floor. The back sidewall 14 is formed with an irregular portion to absorb the irregularities of the floor pan F on which the back sidewall 14 is placed as matched with the irregularities. On the other hand, the top sidewall 12 is formed in a nearly flat surface.

The duct-integrated floor-raising material 10 is made of a thermoplastic resin, and integrally formed by blow molding as described later. Examples of the thermoplastic resin include an ABS resin, a denatured polyphenylene oxide resin, a polycarbonate resin, a polyamide resin, a polystyrene resin, a polyethylene resin, and a polypropylene resin.

The area of the duct-integrated floor-raising material 10, that is, the size of the top sidewall 12 or the back sidewall 14 is appropriately determined according to the place where the raising material 10 is disposed. Moreover, the thicknesses of the top sidewall 12, the back sidewall 14, and the peripheral sidewall 16 are determined in the relationship between a weight reduction in the raising material 10 and the demanded stiffness, particularly compressed stiffness. Furthermore, the thickness of a molten tubular parison, which is a molding material, is determined in consideration of a blowing pressure and a blow ratio, for example, in blow molding described later. The thickness of the raising material 10, which is a final molded component, is determined based on the determined thickness of the tubular parison.

The duct-integrated floor-raising material 10 includes a large hollow portion 18, a small hollow portion 20, and a duct portion 22 disposed between the hollow portions 18 and 20, and the portions 18, 20, and 22 are partitioned from each other.

More specifically, as depicted in FIG. 3, the back sidewall 14 is provided with a first long groove 23 and a second long groove 24. The long grooves inwardly protrude from the back sidewall 14, and extend between the adjacent peripheral sidewalls 16 as a predetermined gap is spaced. Moreover, the first long groove 23 and the second long groove 24 include opposite sidewalls 26 protruding inwardly and a bottom wall 30 formed between lower edges 28 of the opposite sidewalls 26. The first long groove 23 and the second long groove 24 have an inwardly tapered shape at a predetermined tapered angle α. Here, the predetermined tapered angle α is determined according to a blow ratio on the bottom portion of the first long groove 23 or the second long groove 24. The predetermined gap between the first long groove 23 and the second long groove 24 is determined according to the width of the duct portion 22, described later.

The bottom walls 30 of the first long grooves 23 and the second long grooves 24 are welded to an inner surface 32 of the top sidewall 12. Thus, the duct portion 22, the small hollow portion 20, and the large hollow portion 18 are formed as partitioned from each other. Here, the duct portion 22 is configured of a one sidewall 26a of the sidewalls 26 opposite to the first long groove 23, a one sidewall 26a of the sidewalls 26 opposite to the second long groove 24 adjacent to the one sidewall 26a of the sidewalls 26, the top sidewall 12, and the back sidewall 14. An air channel 27 is formed in the duct portion 22. The small hollow portion 20 is configured of the other sidewall 26b of the sidewalls 26 opposite to the first long groove 23, the top sidewall 12, the back sidewall 14, and the peripheral sidewall 16. The large hollow portion 18 is configured of the other sidewall 26b of the opposite sidewalls 26 of the second long groove 24, the top sidewall 12, the back sidewall 14, and the peripheral sidewall 16.

The top sidewall 12 is formed with recessed grooves 34 corresponding to the first long groove 23 and the second long groove 24. The depth of the recessed groove 34 is 10 mm or less, and the width of the opening of the recessed groove 34 is 10 mm or less. The bottom walls 30 of the first long grooves 23 and the second long grooves 24 are welded to the inner surface of the bottom portion of the recessed groove 34. More specifically, in the case where the height of the raising material 10 is low, the blow ratio by blow molding is not increased so much, and the thicknesses of the top sidewall 12 and the back sidewall 14 are not decreased, the recessed grooves 34 on the top sidewall 12 may be omitted. In this case, such a configuration may be possible in which the first long groove 23 and the second long groove 24 extend to the inner surface 32 of the top sidewall 12 and are formed in ribs joining the top sidewall 12 to the back sidewall 14. Thus, the irregularities of the top sidewall 12 felt through the carpet C can be reduced.

As depicted in FIG. 2, the large hollow portion 18 includes the raising portion 2 and the foot rest portion 3 corresponding to the front sidewall surface below the dashboard. The corresponding top sidewall 12 is provided with the recessed grooves 34 to reinforce the top sidewall 12. In some cases, such a configuration may be possible in which the recessed grooves 34 extend to the inner surface of the back sidewall 14 and the recessed grooves 34 are configured as ribs joining the top sidewall 12 to the back sidewall 14.

As similar to the large hollow portion 18, the top sidewall 12 of the small hollow portion 20 is reinforced by providing the recessed grooves 34. The volume of the small hollow portion 20 is smaller than the volume of the large hollow portion 18. Thus, there is a small necessity to provide the ribs joining the top sidewall 12 to the back sidewall 14. However, in some cases, the ribs may be disposed.

The duct portion 22 includes a horizontal straight portion 36, a vertical portion 38, and a horizontal curved portion 40. The horizontal straight portion 36 extends in the vehicle longitudinal direction across the adjacent peripheral sidewalls 16, and is located besides the duct-integrated floor-raising material 10. The vertical portion 38 is connected to the horizontal straight portion 36. The horizontal curved portion 40 is connected to the vertical portion 38, and extends above the duct-integrated floor-raising material 10. An air intake port 42 is disposed at a position protruding outwardly from the peripheral sidewall 16 at one end of the horizontal straight portion 36. Moreover, an air outlet port 44 is disposed at a position protruding outwardly from the peripheral sidewall 16 at one end of the horizontal curved portion 40. Furthermore, the horizontal straight portion 36, the vertical portion 38, and the horizontal curved portion 40 form the air channel 27 in the duct portion 22. The air channel 27 is formed in such a way that the air-conditioned air of the air conditioning unit is delivered from the air outlet port 44 to the rear seat. As depicted in FIG. 2, the air outlet port 44 is provided with a compressed portion 46. The compressed portion 46 divides the channel into two parts.

The channel cross sectional area of the air channel 27 may be appropriately determined according to the relationship between the flow rate of the ventilating air and a passing sound of air produced, for example. Preferably, the height of the air channel 27, that is, the height of the duct portion 22 is set lower than the heights of the large hollow portion 18 and the small hollow portion 20 disposed adjacent to the both sides of the duct portion 22. In this case, the top surface of the duct portion 22 is formed so as not to protrude from the top surfaces of the large hollow portion 18 and the small hollow portion 20. Thus, the duct portion 22 is not directly stepped by the driver D, for example. Moreover, the large hollow portion 18 and the small hollow portion 20 protect the duct portion 22.

It is noted that the top sidewall 12 forming the air channel 27 of the duct portion 22 is formed with recessed grooves 34 as similar to the large hollow portion 18 and the small hollow portion 20.

As depicted in FIG. 4, a molding apparatus 100 for the duct-integrated floor-raising material 10 includes a molten resin extruding device 102 and a mold clamping device 104 disposed below the extruding device 102. The molding apparatus 100 for the duct-integrated floor-raising material 10 delivers a molten tubular parison made of a thermoplastic resin extruded from the extruding device 102 to the clamping device 104. The clamping device 104 blow-molds the molten tubular parison. It is noted that FIGS. 4 to 6 depict the molding apparatus with reference to a cross section along the line B-B on the duct-integrated floor-raising material 10 depicted in FIG. 2. It is noted that in FIGS. 4 to 6, portions indicated by dotted lines depicted in FIG. 2 are omitted.

The extruding device 102 is configured to extrude the molten tubular parison P below and drop the molten tubular parison P between split molds 106A and 106B of the clamping device 104. It is noted that the extruding device 102 is a known device and the detailed description is omitted.

The clamping device 104 includes a pair of the split molds 106A and 106B and a mold drive unit (not depicted).

The two split molds 106A and 106B are disposed as facing a cavity 108. The two split molds 106A and 106B are disposed around the cavity 108 in the nearly vertical direction.

The two split molds 106A and 106B individually include a pinch-off portion 114 formed around the cavity 108. The pinch-off portions 114 are formed annularly along the cavity 108, and protrude toward the molds 106A and 106B opposite to each other. Thus, in clamping the two split molds 106A and 106B, the tip end portions of the pinch-off portions 114 of the split molds 106A and 106B contact with each other. Therefore, the tubular parison P is welded in such a way that a parting line PL is formed on the peripheral edge of the tubular parison P. The hollow portions are formed in the tubular parison P.

The surface of the one cavity 108A has a shape complementary to a shape to be molded on the surface of the top sidewall 12. The surface of the other cavity 108B has a shape complementary to a shape to be molded on the surface of the back sidewall 14.

More specifically, a first projecting portion 110 (not depicted) and a second projecting portion 112 are disposed on the cavity 108B of the one split mold 106B nearly across an annular pinch-off portion 114B. The first projecting portion 110 (not depicted) forms the first long groove 23 protruding inwardly and partitioning the small hollow portion 20 from the duct portion 22 on the back sidewall 14 of the floor-raising material 10. Moreover, the second projecting portion 112 forms the second long groove 24 protruding inwardly and partitioning the large hollow portion 18 from the duct portion 22 on the back sidewall 14 of the floor-raising material 10. Thus, as described later, in blow molding, the first projecting portion 110 and the second projecting portion 112 partition an enclosed space formed in the annular pinch-off portions 114A and 114B by clamping the one split mold 106B into three portions (the large hollow portion 18, the small hollow portion 20, and the duct portion 22).

A third projecting portion 116 is further disposed on the cavity 108A of the split mold 106A opposite to the one split mold 106B. The third projecting portion 116 forms a groove rib protruding from the top sidewall 12 to the hollow portion side on the top sidewall 12. Thus, the bottom walls 30 of the first long grooves 23 and the second long grooves 24 can be welded to the inner surfaces of the bottom portions of the groove ribs.

The cavities 108A and 108B of the split molds 106A and 106B are provided with recesses 120A and 120B to form a waste bag 118 in communication with the duct portion 22. The recesses 120A and 120B are disposed on the outside of the cavity 108 corresponding to the end portion of the duct portion 22 and near the pinch-off portion 114.

Moreover, a protrusion 122 is further disposed on the cavity 108B of the one split mold 106B. The protrusion 122 forms the recessed groove 34 protruding inwardly on the back sidewall 14 of the floor-raising material 10. On the other hand, a protrusion 117 is disposed on the cavity 108A of the other split molds 106A at a position corresponding to the protrusion 122. The protrusion 117 forms the recessed groove 34 protruding inwardly on the top sidewall 12. These protrusions 122 and 117 form a rib joining the back sidewall 14 to the top sidewall 12 in the hollow portion.

The mold drive unit (not depicted) drives the two split molds 106A and 106B. The mold drive unit (not depicted) is a mold drive unit similar to a previously existing one, and the description is omitted. The molds 106A and 106B are configured to drop the molten tubular parison P between the two split molds 106A and 106B at an opening position. Moreover, on the other hand, the pinch-off portions 114 of the two split molds 106A and 106B are contacted with each other at a closing position, and the annular pinch-off portions 114 are contacted with each other. Thus, an enclosed space is formed between the two split molds 106A and 106B.

A previously existing known blow pin 126 is disposed on the split molds 106A and 106B in order that a blowing pressure can be applied to the enclosed space formed by the molds 106A and 106B when clamping the molds 106A and 106B. The blow pin 126 is configured to linearly reciprocate between a piercing position and a waiting position by a piston-cylinder mechanism, for example.

The blow pin 126 is individually disposed on the large hollow portion 18, the small hollow portion 20, and the duct portion 22 partitioned from each other. Particularly, the duct portion 22 is provided with the blow pin 126 on the waste bag 118 formed at two ends of the main body, not on the main body configuring the air channel 27. It is noted that in FIG. 5, only the blow pins 126 to the large hollow portion 18 and the lower waste bag 118 are depicted.

The number of the blow pins 126 disposed and the piercing directions of the blow pins 126 are set as below. Namely, the blow pin 126 is disposed on the large hollow portion 18 and the small hollow portion 20 in the orientation nearly orthogonal to the cavities 108 of the molds 106A and 106B in the horizontal direction. On the other hand, the blow pin 126 to the upper waste bag 118 is disposed on the duct portion 22 in the orientation nearly orthogonal to the cavities 108 of the molds 106A and 106B in the horizontal direction (in the direction from the back to the front or from the front to the back in FIG. 5). On the other hand, the blow pin 126 to the lower waste bag 118 is disposed in the upward direction. The volume of the small hollow portion 20 is smaller than the volume of the large hollow portion 18. Thus, the number of the blow pins 126 to pierce for molding the small hollow portion 20 is smaller than the number of the blow pins 126 to pierce for molding the large hollow portion 18.

Thus, the blow pin 126 can be smoothly pierced in the state in which the tubular parison P is dropped between the split molds 106A and 106B.

The method for producing the automobile floor-raising material 10 is to blow-mold the molten parison P in the split molds 106A and 106B. The method roughly includes the steps of: opening the split molds 106A and 106B; dropping the molten parison P between the opened split molds 106A and 106B; and clamping the split molds 106A and 106B and blowing a pressurized fluid into the molten parison P.

In more detail, as depicted in FIG. 4, first, the molten tubular parison P is disposed between the pair of the split molds 106A and 106B at the opening position. More specifically, the molten parison P is extruded and dropped from the extruding device 102 disposed above the pair of the split molds 106A and 106B. The diameter and thickness of the tubular parison P may be determined in consideration of the blow ratio in blow molding particularly based on the thickness of the automobile floor-raising material 10 demanded after blow molding.

Subsequently, as depicted in FIG. 5, the pair of the split molds 106A and 106B at the opening position is relatively brought close to each other to the clamping position. Namely, the pair of the split molds 106A and 106B is moved to the clamping position, and the tip end portions of the first projecting portion 110 and the second projecting portion 112 of the one mold 106B are faced to the cavity 108A of the other mold 106A and brought close to each other at a predetermined distance. Thus, the molten tubular parison P is pressed flat and extruded from the pinch-off portions 114. Moreover, the pair of the split molds 106A and 106B is moved to the clamping position, the tip end portions of the first projecting portion 110 and the second projecting portion 112 of the one molds 106A and 106B are faced to the tip end portions of the third projecting portions 116 of the cavities 108 of the other molds 106A and 106B, and brought close to each other at a predetermined distance. This predetermined distance is set as below. Namely, the predetermined distance is set in the molten tubular parison P so as to form grooves to be the bases of the first long groove 23, the second long groove 24, and the recessed groove 34. These grooves are formed by the tip end portions of the first projecting portion 110 and the second projecting portion 112 and the tip end portion of the third projecting portion 116 in clamping. Furthermore, the settings above are formed in such a way that the bottom portions of the grooves are reliably welded in welding the bottom portions. Namely, a molten resin in a thickness twice the thickness of the molten parison P exists between the tip end portion of the corresponding third projecting portion 116 and the opposite tip end portions of the first projecting portion 110 and the second projecting portion 112. However, when a predetermined distance is too short, the molten tubular parison P is pressed and extruded from the tip end portions although the bottom portions can be welded. On the other hand, when a predetermined distance is too long, the bottom portions are inadequately welded.

In addition, the split molds 106A and 106B are clamped in this manner, and the portions of the molten tubular parison P corresponding to the pinch-off portions 114 of the pair of the molds 106A and 106B is welded to each other. This welding forms the peripheral sidewall 16, the enclosed hollow portion in the tubular parison P, and grooves for the bases of the first long groove 23, the second long groove 24, and the recessed groove 34. With the formation, a first enclosed space corresponding to the large hollow portion 18, a second enclosed space corresponding to the small hollow portion 20, and a third enclosed space corresponding to the duct portion 22 and the waste bag 118 are formed.

In this case, the first projecting portion 110 and the second projecting portion 112 are disposed across the pinch-off portions 114 in the nearly vertical direction on the cavities 108 of the one split molds 106A and 106B. Thus, the duct portion 22 is molded in the orientation in the nearly vertical direction.

Subsequently, as depicted in FIG. 5, the blow pins 126 are pierced to the outer surfaces of the tubular parison P corresponding to the first enclosed space, the second enclosed space, and the waste bag 118. A pressurized fluid is blown into the molten tubular parison P from the blow pins 126, and the tubular parison P is expanded. The tubular parison P is shaped by being pressed against the corresponding surfaces of the cavities 108 of the split molds 106A and 106B. As a result, the large hollow portion 18, the small hollow portion 20, the duct portion 22, and the waste bag 118 are molded.

More specifically, the formation is as follows. Namely, the waste bag 118 is formed at the end portions of the duct portion 22. The blow pins 126 are pierced to the waste bags 118. A pressurized fluid is blown into the third enclosed space corresponding to the duct portion 22 and the waste bags 118 from the blow pin 126. In this case, in clamping the split molds 106A and 106B in one piece, the blow pins 126 are pierced to the portions corresponding to the pinch-off portions 114 on the waste bags 118. Thus, the portions corresponding to the pinch-off portions 114 are strongly clamped between the pair of the molds 106A and 106B. Therefore, the blow pins 126 can be reliably pierced without escaping the portions of the parison P to be pierced in the piercing direction, for example.

As depicted in FIG. 5, the blow pin 126 to the lower waste bag 118 is pierced upward. The blow pin 126 to the upper waste bag 118 is pierced in the horizontal direction (in the direction from the back to the front, or from the front to the back in FIG. 5). On the other hand, the blow pins 126 to the large hollow portion 18 and the small hollow portion 20 are pierced from the inside of the corresponding molds 106A and 106B in the horizontal direction in the orientation nearly orthogonal to the surface of the cavity 108.

Thus, a reduction in ventilation efficiency caused by air leakage can be suppressed, and the occurrence of an unusual sound from the floor surface can be prevented as well without reducing molding efficiency because the blow pins 126 are smoothly pierced. Moreover, no marks (holes) of the blow pins are left on the main body of the duct portion 22 forming the air conditioning air channel.

Subsequently, the waste bags 118 are cut, the air intake port 42 is formed on one end of the duct portion 22, and the air outlet port 44 is formed on the other end. The air intake port 42 and the air outlet port 44 are formed at the positions protruding outwardly from the peripheral sidewall 16 on which the parting line PL is formed (see FIG. 2). Thus, external ducts can be easily connected to the air intake port 42 and the air outlet port 44.

Subsequently, as depicted in FIG. 6, the pair of the split molds 106A and 106B is opened, and the molded duct-integrated floor-raising material 10 is taken out of the pair of the split molds 106A and 106B. After that, burrs are removed from the duct-integrated floor-raising material 10, and then the duct-integrated floor-raising material 10 is completed.

According to the method for producing the duct-integrated floor-raising material 10 in the configuration described above, the duct portion 22 is molded as follows. Namely, the waste bag 118 is formed on the duct end portion (on the air intake port 42 side or the air outlet port 44 side). The blow pin is pierced to the waste bag 118, and a blowing pressure is applied to the inside for shaping. Thus, the duct portion 22 is molded. Subsequently, the waste bag 118 is cut along burrs in the split molds 106A and 106B or after taking out the molded component, and the air intake port 42 or the air outlet port 44 is formed. Therefore, no marks (holes) of the blow pins are left on the portion to form the air channel 27. Thus, a reduction in ventilation efficiency is prevented, and the occurrence of an unusual sound from the mark of the blow pin can be prevented as well. Thus, the duct-integrated floor-raising material 10 can be efficiently manufactured while maintaining the performance or the quality of a duct.

In the following, a second embodiment of the present invention will be described with reference to FIGS. 7 and 8. In the description below, components similar to the components of the first embodiment are designated the same reference numbers, and the descriptions are omitted. In the following, the feature point of the embodiment will be described in detail.

The feature point of the embodiment is in that a part of a raising portion is blow-molded through a communicating port. More specifically, the feature point of the embodiment is in that a communicating passage 50 is disposed to communicate a small hollow portion 20 with a duct portion 22.

The communicating passage 50 that communicates the small hollow portion 20 with the duct portion 22 will be described with reference to FIG. 7. FIG. 7 is a detailed diagram illustrating the communicating passage 50. FIG. 7(A) is a partial cross-sectional view in the extending direction of the communicating passage 50, and FIG. 7(B) is a partial cross-sectional view along the line C-C in FIG. 7(A).

As depicted in FIG. 7, the communicating passage 50 is disposed on a bottom portion 30 of a first long groove 23 partitioning the small hollow portion 20 from the duct portion 22. More specifically, the communicating passage 50 has a length corresponding to the width of the bottom portion 30, and communicates a one sidewall 26a with the other sidewall 26b of opposite sidewalls of the first long groove 23.

As depicted in FIG. 7(B), the cross section of the communicating passage 50 is in a semicircle, and preferably, the radius ranges from 2 to 10 mm. When the radius is smaller than 2 mm, it is likely to clog the communicating passage 50 caused by variations in the wall thickness of a tubular parison P in blow molding described later. Moreover, when the radius is greater than 10 mm, the tubular parison P is extended too much, and the communicating passage 50 is sometimes broken in blow molding.

The wall thickness of the tubular parison P is the bases of the wall thicknesses of a top sidewall 12, a back sidewall 14, and a peripheral sidewall 16 of a duct-integrated floor-raising material 100, which is a molded component. For example, in the case where the raising amount demanded for the raising material 100 is large, the height of the peripheral sidewall 16 is increased. Moreover, in this case, the blow ratio is increased in molding, and the thicknesses of the curved portions of the frame walls are reduced. In this case, it is necessary to basically increase the wall thickness of the tubular parison P for a reduction in the thickness. Thus, the restrictions on the upper limit of the size of the cross sectional form of the communicating passage 50 are relaxed. On the other hand, in the case where the raising amount demanded for the raising material 100 is small, the height of the peripheral sidewall 16 is reduced. Furthermore, in this case, the blow ratio is reduced in molding, and the thicknesses of the curved portions of the frame walls are not reduced. In this case, it is unnecessary to increase the wall thickness of the tubular parison P for a reduction in the thickness. Thus, the restrictions on the upper limit of the size of the cross sectional form of the communicating passage 50 tend to be tighter.

On this point, the position at which the communicating passage 50 is disposed may be appropriately disposed at a position of the first long groove 23. In the case where the restrictions on the cross sectional form of the communicating passage 50 are great in terms of molding, a plurality of the communicating passages 50 may be disposed along the first long groove 23 as a predetermined gap is spaced.

It is noted that the cross sectional form of the communicating passage 50 is not limited in a semicircle. The cross sectional form of the communicating passage 50 may be a given shape as long as it is possible that a pressurized fluid introduced from a waste bag 118 formed on the duct portion 22, described later, is blown into the small hollow portion 20 through the communicating passage 50 in blow molding and the small hollow portion 20 is smoothly molded.

In the provision of the communicating passage 50 described above, as depicted in FIG. 8, split molds 106 are disposed in such a way that a tip end portion 111 of a first projecting portion 110 is provided with a recess 113 to form the communicating passage 50 across the thickness direction of the first projecting portion 110. Preferably, the recess 113 is formed in a groove that the tip end portion 111 of the first projecting portion 110 is notched. Moreover, a width d and the cross sectional form of the recess 113 form the length and cross sectional form of the communicating passage 50.

Cavities 108A and 108B of split molds 106A and 106B are respectively provided with recesses 120A and 120B to form the waste bag 118 in communication with the duct portion 22. The recesses 120A and 120B are disposed on the outside of the cavity 108 corresponding to the end portion of the duct portion 22 and near the pinch-off portion 114.

Furthermore, a protrusion 122 is further disposed on the cavity 108B of the one split mold 106B. The protrusion 122 forms a recessed groove 34 protruding inwardly on the back sidewall 14 of the floor-raising material 100. On the other hand, a protrusion 117 is disposed on the cavity 108A of the other split molds 106A at a position corresponding to the protrusion 122. The protrusion 117 forms a recessed groove 36 protruding inwardly on the top sidewall 12. These protrusions 122 and 117 form a rib joining the back sidewall 14 to the top sidewall 12 in the hollow port.

In molding using the split molds 106A and 106B, the split molds 106A and 106B are clamped in this manner, and the portions of the molten tubular parison P corresponding to the pinch-off portions 114 of the pair of the molds 106A and 106B is welded to each other. This welding forms the peripheral sidewall 16 and the enclosed hollow portion in the tubular parison P. On the other hand, the first projecting portion 110 to a third projecting portion 116 form grooves for the bases of the first long groove 23, a second long groove 24, and the recessed groove 34, and the bottom portions of the first long groove 23 and the second long groove 24 are welded to the bottom portions of the corresponding recessed grooves 34 except the portion corresponding to the recess 113 disposed on the tip end portion 111 of the first projecting portion 110. Therefore, the tip end portion 111 of the first projecting portion 110 forms a first enclosed space corresponding to the large hollow portion 18 and a third enclosed space corresponding to the duct portion 22 and the waste bag 118 in communication with the small hollow portion 20 through the communicating passage 50.

In this case, the first projecting portion 110 and the second projecting portion 112 are disposed across the pinch-off portions 114 in the nearly vertical direction on the cavities 108 of the one split molds 106A and 106B. Thus, the duct portion 22 is molded in the orientation in the nearly vertical direction.

Subsequently, as depicted in FIG. 5, blow pins 126 are pierced to the outer surfaces of the tubular parison P corresponding to the first enclosed space and the waste bag 118. A pressurized fluid is blown into the molten tubular parison P from the blow pins 126, and the tubular parison P is expanded. The tubular parison P is shaped by being pressed against the corresponding surfaces of the cavities 108 of the split molds 106A and 106B. As a result, the large hollow portion 18, the duct portion 22, and the waste bag 118 are molded. With the molding, a pressurized fluid introduced into the duct portion 22 and the waste bag 118 through the communicating passage 50 is blown into the small hollow portion 20. Thus, the small hollow portion 20 is molded as well.

As depicted in FIG. 5, the blow pin 126 to the lower waste bag 118 is pierced upward. The blow pin 126 to the upper waste bag 118 is pierced in the horizontal direction (in the direction from the back to the front, or from the front to the back in FIG. 5). On the other hand, the blow pin 126 to the large hollow portion 18 is pierced from the inside of the corresponding molds 106A and 106B in the horizontal direction in the orientation nearly orthogonal to the surface of the cavity 108.

According to the method for producing the duct-integrated floor-raising material 100 in the configuration described above, the large hollow portion 18 is molded as follows. Namely, the blow pin 126 is pierced to the outer surface of the tubular parison P corresponding to the large hollow portion 18, and a blowing pressure is applied to the inside for shaping. On the other hand, the duct portion 22 is molded as follows. Namely, the waste bag 118 is formed on the duct end portion (on the air intake port side or the air outlet port side). The blow pin 126 is pierced to the waste bag 118, and a blowing pressure is applied to the inside for shaping. Thus, the duct portion 22 is molded. The air intake port 42 or the air outlet port 44 is formed in such a way that the waste bag 118 is cut along burrs in the split molds 106 or after taking out the molded component. Therefore, no marks (holes) of the blow pins 126 are left on the portion on which an air channel 27 is formed. Thus, a reduction in ventilation efficiency is prevented, and the occurrence of an unusual sound from the mark of the blow pin 126 can be prevented as well. Moreover, blowing air from the duct portion 22 is delivered to the small hollow portion 20 through the communicating passage 50. Hence, the number of the blow pins 126 to pierce is reduced in the duct-integrated floor-raising material 100 as a whole. Thus, degradation of the circulation of blowing air can be prevented, and excellent molding properties can be secured. With the prevention and provision, the volume of the hollow portion in the duct portion 22 is increased by communicating the duct portion 22 with the small hollow portion 20 using the communicating passage 50. This increase in the volume of the hollow portion can also reduce a passing sound of ventilating air passing through the duct portion 22. Thus, a duct-integrated floor-raising material can be efficiently manufactured as excellent molding properties are secured while maintaining the performance or the quality of a duct including the sound insulation properties and the ventilation.

In the following, a third embodiment according to the present invention will be described with reference to FIGS. 9, 10, 25, and 26. In the description below, components similar to the components of the first embodiment are designated the same reference numbers, and the description is omitted. In the following, the feature point of the embodiment will be described in detail.

The feature point of the embodiment is in that a portion corresponding to the small hollow portion is a solid wave portion.

A duct-integrated floor-raising material 100 is provided with a large hollow portion 18 and a duct portion 22 disposed between the large hollow portion 18 and a solid wave portion 20 described later as partitioned from each other.

More specifically, as depicted in FIGS. 25 and 26, a back sidewall 14 is provided with a first long groove 23 and a second long groove 24. The long grooves inwardly protrude from the back sidewall 14, and extend as a predetermined gap is spaced between adjacent peripheral sidewalls 16. Moreover, the first long groove 23 and the second long groove 24 include opposite sidewalls 26 protruding inwardly and a bottom wall 30 formed between lower edges 28 of the opposite sidewalls 26. The first long groove 23 and the second long groove 24 have an inwardly tapered shape at a predetermined tapered angle α. Here, the predetermined tapered angle α is determined according to a blow ratio on the bottom portion of the first long groove 23 or the second long groove 24. The predetermined gap between the first long groove 23 and the second long groove 24 is determined according to the width of the duct portion 22, described later.

The bottom walls 30 of the first long grooves 23 and the second long grooves 24 are welded to an inner surface 32 of a top sidewall 12. Thus, the duct portion 22 and the large hollow portion 18 are formed as partitioned from each other. Here, the duct portion 22 is configured of a one sidewall 26a of the sidewalls 26 opposite to the first long groove 23, a one sidewall 26a of the sidewalls 26 opposite to the second long groove 24 adjacent to the one sidewall 26a of the sidewalls 26, the top sidewall 12, and the back sidewall 14. An air channel 27 is formed in the duct portion 22. The large hollow portion 18 is configured of the other sidewall 26b of opposite sidewalls 26 of the second long groove 24, the top sidewall 12, the back sidewall 14, and the peripheral sidewall 16.

The top sidewall 12 is formed with recessed grooves 34 corresponding to the first long groove 23 and the second long groove 24. The depth of the recessed groove 34 is 10 mm or less, and the width of the opening of the recessed groove 34 is 10 mm or less. The bottom walls 30 of the first long grooves 23 and the second long grooves 24 are welded to the inner surfaces of the bottom portions of the recessed grooves 34. More specifically, in the case where the height of the raising material 100 is low, the blow ratio by blow molding is not increased so much, and the thicknesses of the top sidewall 12 and the back sidewall 14 are not decreased, the recessed grooves 34 on the top sidewall 12 may be omitted. In this case, such a configuration may be possible in which the first long groove 23 and the second long groove 24 extend to the inner surface 32 of the top sidewall 12 and are formed in ribs joining the top sidewall 12 to the back sidewall 14. Thus, the irregularities of the top sidewall 12 felt through a carpet C can be reduced.

The solid wave portion 20 will be described with reference to FIG. 9. Heretofore, this region is a portion formed as a hollow portion narrower than the large hollow portion 18. This portion is formed as a wave portion instead of a hollow portion. The shape and length of a wave may be appropriately determined from the ease of molding described later. For example, as depicted in FIG. 9, the wave may be in a mountain shape or in a curved shape, and the wave may be highly stiffened by reducing the length and increasing the number of waves.

Here, the height of a wave will be described. The height of a wave is determined so as to exert a raising function in such a way that the height is at almost the same level of the top surface of the top sidewall 12 on the top sidewall 12 side of the solid wave portion 20. On the other hand, the height of a wave is determined in such a way that the height is in a shape complementary to the irregularities of a floor pan F on the back sidewall 14 side of the solid wave portion 20.

The solid wave portion 20 is in a substantially solid shape, different from the large hollow portion 18 and the duct portion 22. However, as described later, the solid wave portion 20 is molded in which two wall surfaces of a tubular parison P are integrally welded by clamping the molten tubular parison P using a pair of split molds 106. Therefore, a tubular space in the tubular parison P is sometimes left as a fine hollow portion in the solid wave portion 20.

The channel cross sectional area of the air channel 27 may be appropriately determined according to the relationship between the flow rate of the ventilating air and a passing sound of air produced, for example. Preferably, the height of the air channel 27, that is, the height of the duct portion 22 is set lower than the heights of the top surfaces of the large hollow portion 18 and the solid wave portion 20 disposed adjacent to both sides of the duct portion 22. In this case, the top surface of the duct portion 22 is formed so as not to protrude from the top surfaces of the large hollow portion 18 and the solid wave portion 20. Thus, the duct portion 22 is not directly stepped by a driver D, for example. Moreover, the large hollow portion 18 and the solid wave portion 20 protect the duct portion 22.

It is noted that the top sidewall 12 forming the air channel 27 of the duct portion 22 is formed with the recessed grooves 34 as similar to the large hollow portion 18.

Two split molds 106A and 106B individually include a pinch-off portion 114 formed around the cavity 108 in order to provide the solid wave portion 20. The pinch-off portion 114 is formed annularly along the cavity 108, and protrudes toward the molds 106A and 106B opposite to each other. Thus, in clamping the two split molds 106A and 106B, the tip end portions of the pinch-off portions 114 of the split molds 106A and 106B contact with each other, and the tubular parison P is welded in such a way that a parting line PL is formed on the peripheral edge. The hollow portion is formed in the tubular parison P.

The surface of a one cavity 108A has a shape complementary to a shape to be molded on the surface of the top sidewall 12. The surface of the other cavity 108B has a shape complementary to a shape to be molded on the surface of the back sidewall 14.

More specifically, a first projecting portion 110 (not depicted) and a second projecting portion 112 are disposed on the cavity 108B of the one split mold 106B nearly across an annular pinch-off portion 114B. The first projecting portion 110 (not depicted) forms the first long groove 23 protruding inwardly and partitioning the solid wave portion 20 from the duct portion 22 on the back sidewall 14 of the floor-raising material 100. Moreover, the second projecting portion 112 forms the second long groove 24 protruding inwardly and partitioning the large hollow portion 18 from the duct portion 22 on the back sidewall 14 of the floor-raising material 100. Thus, as described later, in blow molding, an enclosed space formed in annular pinch-off portions 114A and 114B by clamping the one split mold 106B is divided into two parts (the large hollow portion 18, and the duct portion 22 and a waste bag 118) by the second projecting portion 112.

Furthermore, as depicted in FIG. 10, a pair of the cavities 108A and 108B of the split molds 106A and 106B is provided with a plurality of projections 125 on the opposite side of the hollow portion in the duct portion 22 to form the solid wave portion 20. The projections 125 are formed in such a way that the second projecting portion 112 is a single protrusion and the projections 125 are alternately in a complementary shape. In other words, the projections 125 disposed on the cavities 108A and 108B are vertically disposed in an offset manner.

In the case where the form of the wave of the solid wave portion 20 is in a mountain shape, the shape of the wave of the projection 125 is in a mountain shape. Thus, as described later, in clamping the pair of the split molds 106A and 106B, the projections 125 of the pair of the split molds 106A and 106B is brought close to each other at a predetermined distance. Thus, the space of a wave is formed by an inclined surface 127 of the projection 125 of the one cavity 108, an inclined surface 127 of the projection 125 of the other one cavity 108 vertically adjacent to the one cavity 108, the top of the projection 125, and the surface of the cavity 108 opposite to the top.

In addition, the cavity 108B of the one split mold 106B is further provided with a protrusion 122 to form of the recessed groove 34 protruding inwardly on the back sidewall 14 of the floor-raising material 100. On the other hand, the cavity 108A of the other split molds 106A is further provided with a protrusion 117 at a position corresponding to the protrusion 122 to form the recessed groove 36 protruding inwardly on the top sidewall 12. Thus, a rib joining the back sidewall 14 to the top sidewall 12 is formed in the large hollow portion 18.

A blow pin 126 is disposed according to the large hollow portion 18 and the duct portion 22 partitioned from each other. Particularly, the duct portion 22 is provided with the blow pin 126 to the waste bag 118 formed at two ends of the main body, not on the main body configuring the air channel 27. It is noted that in FIG. 5, only the blow pins 126 to the large hollow portion 18 and the lower waste bag 118 are depicted.

The number of the blow pins 126 disposed and the piercing directions of the blow pins 126 are set as below. Namely, the blow pin 126 to the large hollow portion 18 is disposed in the direction horizontal to the orientation nearly orthogonal to the cavities 108 of the molds 106A and 106B. On the other hand, the blow pin 126 to the upper waste bag 118 of the duct portion 22 is disposed in the orientation nearly orthogonal to the cavities 108 of the molds 106A and 106B in the horizontal direction (in the direction from the back to the front or from the front to the back in FIG. 5). On the other hand, the blow pin 126 to the lower waste bag 118 is disposed in the upward direction.

Thus, the blow pin 126 can be smoothly pierced in the state in which the tubular parison P is dropped between the split molds 106A and 106B.

The settings are made for the molten tubular parison P to be reliably molded and welded as follows. The molten tubular parison P is formed with grooves for the bases of the first long groove 23, the second long groove 24, and the recessed groove 34. These grooves are formed by the tip end portions of the first projecting portion 110 and the second projecting portion 112 and the tip end portion of the third projecting portion 116 in clamping the split molds 106A and 106B. The bottom portions of the grooves are welded to each other, a wave space is formed between the cavities 108A and 108B with the projections 125 of the cavities 108A and 108B, and the molten tubular parison P is molded in the wave space.

Namely, a molten resin in a thickness twice the thickness of the molten parison P exists between the tip end portion of the third projecting portion 116 and the corresponding tip end portions of the first projecting portion 110 and the second projecting portion 112. When a predetermined distance is too short, the molten tubular parison P is pressed and extruded from the tip end portions although the bottom portions can be welded. On the other hand, when a predetermined distance is too long, the bottom portions are inadequately welded. Similarly, it is difficult to integrally weld two wall surfaces of the tubular parison P in the wave space depending on the gap between the projections 125 of the cavities 108A and 108B so as not to form a substantial hollow portion by the projections 125 of the cavities 108A and 108B.

Moreover, the split molds 106A and 106B are clamped in this manner, and the portions of the molten tubular parison P corresponding to the pinch-off portions 114 of a pair of the molds 106A and 106B is welded to each other. This welding forms the peripheral sidewall 16, an enclosed hollow portion in the tubular parison P, and grooves for the bases of the first long groove 23, the second long groove 24, and the recessed groove 34. With the formation, a first enclosed space corresponding to the large hollow portion 18 and a third enclosed space corresponding to the duct portion 22 and the waste bag 118 are formed.

In this case, the first projecting portion 110 and the second projecting portion 112 are disposed across the pinch-off portions 114 in the nearly vertical direction on the cavities 108 of the one split molds 106A and 106B. Thus, the duct portion 22 is molded in the orientation in the nearly vertical direction.

Subsequently, as depicted in FIG. 6, the blow pins 126 are pierced to the outer surfaces of the tubular parison P corresponding to the first enclosed space and the waste bag 118. A pressurized fluid is blown into the molten tubular parison P from the blow pins 126, and the tubular parison P is expanded. The tubular parison P is shaped by being pressed against the corresponding surfaces of the cavities 108 of the split molds 106A and 106B. As a result, the large hollow portion 18, the duct portion 22, and the waste bag 118 are molded.

As depicted in FIG. 5, the blow pin 126 to the lower waste bag 118 is pierced upward. The blow pin 126 to the upper waste bag 118 is pierced in the horizontal direction (in the direction from the back to the front, or from the front to the back in FIG. 5). On the other hand, the blow pin 126 to the large hollow portion 18 is pierced from the inside of the corresponding molds 106A and 106B in the horizontal direction in the orientation nearly orthogonal to the surface of the cavity 108.

According to the method for producing the duct-integrated floor-raising material 100 in the configuration described above, the large hollow portion 18 is molded as follows. Namely, the blow pin 126 is pierced to the outer surface of the tubular parison P corresponding to the large hollow portion 18, and a blowing pressure is applied to the inside for shaping. On the other hand, the duct portion 22 is molded as follows. Namely, the waste bag 118 is formed on the duct end portion (on the air intake port side or the air outlet port side). The blow pin 126 is pierced to the waste bag 118, and a blowing pressure is applied to the inside for shaping. Thus, the duct portion 22 is molded. The air intake port 42 or the air outlet port 44 is formed in such a way that the waste bag 118 is cut along burrs in the split molds 106 or after taking out the molded component. Therefore, no marks (holes) of the blow pins 126 are left on the portion on which the air channel 27 is formed. Thus, a reduction in ventilation efficiency is prevented, and the occurrence of an unusual sound from the mark of the blow pin 126 can be prevented as well. Moreover, the portion, which is a small hollow portion in the previously existing techniques, occupies a small area in the hollow portion of the entire raising material 100 and has a small influence. Thus, the portion, which is a small hollow portion in the previously existing techniques, can be completed as the solid wave portion 20. Namely, the height of a wave exerting the floor-raising function is formed using compression in clamping the split molds 106 in order to blow-mold the large hollow portion 18 and the duct portion 22. Thus, two wall surfaces of the tubular parison P are integrally welded to each other so as not to produce a substantial hollow portion, and the solid wave portion 20 can be completed. The raising material 100 can be therefore efficiently manufactured as a weight reduction is secured while maintaining the performance or the quality of a duct.

In the following, a fourth embodiment of the present invention will be described with reference to FIGS. 11 to 16. In the description below, components similar to the components of the first embodiment are designated the same reference numbers, and the description is omitted. In the following, the feature point of the embodiment will be described in detail.

The feature point of the embodiment is in that a round rib opened on the long groove side is disposed on a long groove partitioning a hollow portion from a duct portion.

Reinforcing ribs disposed on the back sidewall 14 side will be described with reference to FIGS. 11 to 14. Three different groove reinforcing ribs 200, 202 and 204 are formed on an edge portion along a first long groove 23 of a back sidewall 14 of a small hollow portion 20 and on an edge portion along a second long groove 24 of a back sidewall 14 of a large hollow portion 18. The reinforcing ribs 200, 202 and 204 inwardly protrude from the back sidewall 14 along the first long groove 23 or along the second long groove 24 as a predetermined gap is spaced. The openings of the reinforcing ribs 200, 202 and 204 are formed so as to face the first long groove 23 or the second long groove 24.

More specifically, a recess opened upwardly is disposed on the other sidewall 26b of the opposite sidewalls of the first long groove 23 and the second long groove 24 on the corresponding edge portion side. Any of the reinforcing ribs are formed of a peripheral side surface 207 extending from the edge portion of the recess to the hollow portion side and a bottom face 208 formed of the lower edge of the peripheral side surface 207. The wall thickness of the reinforcing rib is nearly equal to the wall thickness of the back sidewall 14.

As depicted in FIG. 13, the reinforcing rib 200 has a simple structure in a tapered shape downwardly from a recess in a semicircular shape disposed on the back sidewall 14 and going to the corresponding edge portion side. Moreover, the bottom face 208 of the reinforcing rib 200 is welded to the inner surface of a top sidewall 12.

As depicted in FIGS. 12 and 13, the reinforcing rib 204 includes a shallow groove 205 extending from the recess to the hollow portion side and a truncated cone groove 106 connected to the end portion of the shallow groove 205 apart from the second long groove 24. The truncated cone groove 106 is deeper than the shallow groove 205. The shallow groove 205 is opened to the peripheral side surface of the truncated cone groove 106. The bottom face of the truncated cone groove 106 is welded to the bottom portion of a recessed groove 34 disposed on the top sidewall 12.

As depicted in FIG. 12, the reinforcing rib 202 has a simple structure similar to the structure of the reinforcing rib 200. The reinforcing rib 202 is in a tapered shape downwardly from a U-shaped recess opened to the corresponding edge portion disposed on the back sidewall 14. A part of the bottom face 208 is welded to the inner surface of the top sidewall 12.

The types of the reinforcing ribs to adopt and the number of the reinforcing ribs disposed may be appropriately determined according to the gap between the back sidewall 14 and the top sidewall 12 with a necessary raising amount. For example, in the case where the raising amount is great, it is fine that the gap between the adjacent reinforcing ribs is narrowed and the number of the reinforcing ribs disposed is increased. Namely, in this case, since the blow ratio is increased, the thicknesses of the edge portions (the corner portions) of the large hollow portion 18 and the small hollow portion 20 toward a duct portion 22 are decreased accordingly, and the reduction is reinforced by the reinforcing ribs.

As described above, the occurrence of a fold, which is a problem unique to blow molding, can be avoided in which the reinforcing rib is opened on the long groove side and a shallow groove is particularly disposed. This point will be described below. In the case of blow molding, a molten resin is pressed against a cavity for molding using a blowing pressure. However, as depicted in FIG. 15, a gap between the second long groove 24 and a truncated cone rib 206 is a gap between protrusions. Thus, a fold P is sometimes produced because the molten resin does not extend sufficiently along the cavity surface as depicted in FIG. 16. Thus, a molded component in a desired shape is not molded, and a defect molding portion is then produced.

As depicted in FIG. 14, the occurrence of a fold can be prevented by opening the reinforcing rib on the long groove side or by providing the shallow groove 205 between the protrusions. Thus, a defect molding portion in association with the occurrence of a fold can be avoided.

As described above, the reinforcing ribs 200 to 104 are disposed on the corner portions toward the duct portion 22 side of the small hollow portion 20 and the large hollow portion 18. Hence, the top surface of the duct portion 22 does not protrude from the top surfaces of the large hollow portion 18 and the small hollow portion 20. Thus, for example, the duct portion 22 is not directly stepped by a driver D. Moreover, the large hollow portion 18 and the small hollow portion 20 can effectively protect the duct portion 22.

According to the duct-integrated floor-raising material in the configuration described above, the top sidewall 12 or the back sidewall 14 is provided with the first long groove 23 and the second long groove 24 as the integrated hollow double wall structure by blow molding. The first long groove 23 and the second long groove 24 protrude from the top sidewall 12 or the back sidewall 14 to the hollow portion side, and extend between the peripheral sidewalls 16 adjacent to each other or opposite to each other. The bottom walls of the first long groove 23 and the second long groove 24 are welded to the inner surface of the back sidewall 14 or the top sidewall 12. Thus, the hollow portion and the duct portion are disposed as partitioned from each other. The duct portion includes a width formed of a predetermined gap between the first long groove 23 and the second long groove 24, and forms an air channel in the inside of the duct portion. Therefore, the weight can be reduced. The thickness of the edge portion of the top sidewall 12 or the back sidewall 14 of a hollow portion of a high blow ratio along the first long groove 23 or the second long groove 24 (the corner portion, that is, the edge on the opposite side of the lower edge of the opposite sidewall) is reduced in blow molding. In this case, a plurality of the reinforcing ribs 200, 202 and 204 is disposed on the edge portion along the edge portion as a predetermined gap is spaced. These reinforcing ribs 200, 202 and 204 are in grooves inwardly protruding from the top sidewall 12 or the back sidewall 14. The openings of the reinforcing ribs 200, 202 and 204 face the first long groove 23 or the second long groove 24. As described above, the reinforcing ribs 200, 202 and 204 lower than the hollow portion are disposed. Thus, a sufficient stiffness, particularly compressed stiffness can be secured around the edge portion of the hollow portion while suppressing a further increase in the blow ratio. Thus, the adjacent duct portion can be protected as well, and a sufficient stiffness can be secured while achieving a weight reduction.

In the following, a fifth embodiment to a seventh embodiment of the present invention will be described with reference to FIGS. 17 to 22. In the description below, components similar to the components of the first embodiment are designated the same reference numbers, and the description is omitted. In the following, the feature point of the embodiment will be described in detail.

The feature point of the embodiment is in that a reinforcing rib is disposed on a duct channel.

A raising material 10 has a hollow double wall structure formed of a top sidewall 12 and a back sidewall 14. Moreover, in the raising material 10, a first recessed groove 23 and a second recessed groove 24 protruding from the back sidewall 14 to the hollow portion 27 side are integrally formed on the top sidewall 12 with a welded portion 30 (see FIG. 18). Thus, a duct portion 22 is disposed between the first recessed groove 23 and the second recessed groove 24 including an air channel 64 isolated from a hollow portion 27 of the raising material 10. Furthermore, the top sidewall 12 is formed with depressions 34 corresponding to the first recessed groove 23 and the second recessed groove 24. The depth of the depression 34 is 10 mm or less, and the width of the opening of the depression 34 is 10 mm or less. The duct portion 22 is erected from the side surface of the raising material 10. The duct portion 22 includes an air intake port 42 to introduce air-conditioned air from an air conditioning unit. In addition, the duct portion 22 includes an air outlet port 44 opened on the rear side surface of the raising material 10. The air conditioning unit can deliver the air-conditioned air from the air outlet port 44 to the rear seat. A long groove 15 is formed on the portions of the top sidewall 12 and the duct portion 11 forming the air channel 64 (see FIG. 17). It is noted that 66 denotes a carpet (see FIG. 18).

Particularly, in the case where the height of the raising material 10 is high and the thicknesses of the top sidewall 12 and the back sidewall 14 are reduced due to the relationship of the blow ratio by blow molding, an integrated hollow structure body may be adopted for the long groove 15 disposed on the top sidewall 12. A plurality of ribs extending between the top sidewall 12 and the back sidewall 14 and joining the two walls is disposed in the integrated hollow structure body for angling compressive strength.

Next, the fifth embodiment disposed on the raising material 10 thus configured will be described with reference to FIGS. 17 to 20.

A long groove 15 is an elongated portion protruding downwardly from the top sidewall 12 of the raising material 10 to the inside of the air channel 64 along an air flow. The shape of the long groove 15 is like a narrow boat. The long groove 15 is configured of an upstream side tapered portion 15a in a nearly streamline formed on the upstream side of the air flow, a downstream side tapered portion 15b in a nearly streamline formed on the downstream side of the air flow similar to the upstream side tapered portion 15a, and a long groove main body 15c extending along the curve of the air channel 64 between the upstream side tapered portion 15a and the downstream side tapered portion 15b. The length of the long groove 15 is in terms of design determined according to a necessary reinforcement. On the other hand, preferably, the width is determined in such a way that the width of the recess formed on the surface of the top sidewall 12 is 10 mm or less.

According to the long groove 15 thus configured, the long groove 15 is disposed along the air channel 64, and formed narrow. Moreover, the long groove 15 includes two end portions formed in a tapered streamline. As described above, the long groove 15 has a boat shape that rarely produces resistance hydrodynamically. Therefore, it is also possible to greatly reduce the air resistance to be produced due to the existence of the long groove 15.

Particularly, in the case where the raising material 10 is blow-molded, when the height of the raising material 10 is not high so much, it can be prevented that the thickness of the long groove 15 is extremely reduced due to a low height of the raising material 10. Thus, such a configuration may be possible in which the long groove 15 extends to the inner surface of the back sidewall 14 and is welded to the inner surface.

It is noted that for example, one or a plurality of current plates (not depicted) may be disposed at least on the upstream side of the air flow on the long groove. Generally, air flowing in the air duct formed windingly flows in the duct as a turbulent flow. Therefore, such turbulent air is turned into a laminar flow using the current plates before flowing into the long groove. Thus, the occurrence of air resistance can be further reduced.

Next, the sixth embodiment of a long groove 15' disposed on the raising material 10 thus configured will be described with reference to FIGS. 17 and 21. It is noted that in the drawings, components similar to the components of the fifth embodiment are designated the same reference numerals and signs.

The long groove 15' is an elongated portion protruding downwardly from the top sidewall 12 of the raising material 10 to the inside of the air channel 64 along an air flow. The shape of the cross section orthogonal to the air channel 64 of the long groove 15' is like a narrow trapezoid. The long groove 15' is configured of an upstream side tapered portion 15a' in a nearly V-shape formed on the upstream side of the air flow, a downstream side tapered portion 15b' in a nearly V-shape formed on the downstream side of the air flow like the upstream side tapered portion 15a', and a long groove main body 15c' extending along the curve of the air channel 64 between the upstream side tapered portion 15a' and the downstream side tapered portion 15b'. The length of the long groove 15' is in terms of design determined according to a necessary reinforcement. On the other hand, preferably, the width is determined in such a way that the width of the recess formed on the surface of the top sidewall 12 is 10 mm or less.

According to the long groove 15' thus configured, the long groove 15' is disposed along the air channel 64, and formed narrow. Moreover, the long groove 15' includes two end portions formed in a tapered V-shape. Thus, air resistance to be produced can be reduced due to the existence of the long groove 15'.

Next, the seventh embodiment of long grooves 15 and 16 disposed on the raising material 10 thus configured will be described with reference to FIGS. 17 and 22. It is noted that in the drawings, components similar to the components of the fifth embodiment are designated the same reference numerals and signs. In the embodiment, a pair of the long grooves 15 and 16 is adopted, and the top sidewall 12 and the back sidewall 14 are supported by the pair of the long grooves 15 and 16.

A long groove 19 is an elongated portion protruding upwardly from the back sidewall 14 of the raising material 10 to the inside of the air channel 64 along an air flow. The long groove 19 has a shape that the long groove 15 is upside down. Namely, the shape of the long groove 19 is a narrow boat upside down. The long groove 19 is configured of an upstream side tapered portion 19a in a nearly streamline formed on the upstream side of the air flow, a downstream side tapered portion 19b in a nearly streamline formed on the downstream side of the air flow like the upstream side tapered portion 19a, and a long groove main body 19c extending along the curve of the air channel 64 between the upstream side tapered portion 19a and the downstream side tapered portion 19b. Preferably, the dimensions and width of the long groove 19 are the same as the dimensions and width of the long groove 15.

The tip end portions of the long groove 15 and the long groove 19, that is, the bottoms in the boat shape are integrally joined to each other on a welded portion 17, which are welded to each other simultaneously when molded in blow molding (or vacuum molding) the raising material 10.

According to the long grooves 15 and 16 thus configured, the tip end portions of the long grooves 15 and 16 extending in the inside of the air channel 64 are joined to each other with the welded portion 17. Thus, a vertical wall structure is formed in the duct portion 11. A load applied to the top sidewall 12 can be therefore transmitted to the back sidewall 14 and supported on the floor of the car body.

For an exemplary modification, a pair of long grooves 15' in the sixth embodiment may be similarly disposed between the top sidewall 12 and the back sidewall 14 as long grooves 15' and 16' are upside down.

In this case, similarly, a long groove 19' is an elongated portion protruding upwardly from the back sidewall 14 of the raising material 10 to the inside of the air channel 64 along an air flow. The long groove 19' has a shape that the long groove 15' is upside down. Namely, the shape of the cross section of the long groove 19' orthogonal to the air channel 64 is like a narrow trapezoid, which is upside down. The long groove 19' is configured of an upstream side tapered portion 19a' in a nearly V-shape formed on the upstream side of the air flow, a downstream side tapered portion 19b' in a nearly V-shape formed on the downstream side of the air flow like the upstream side tapered portion 19a', and a long groove main body 19c' extending along the curve of the air channel 64 between the upstream side tapered portion 19a' and the downstream side tapered portion 19b'. Preferably, the dimensions and width of the long groove 19' are the same as the dimensions and width of the long groove 15'.

The tip end portions of the long groove 15' and the long groove 19', that is, the short sides in a trapezoid shape are integrally joined to each other on a welded portion 17', which are welded to each other simultaneously when molded in blow molding (or vacuum molding) the raising material 10.

In the following, an eighth embodiment of the present invention will be described with reference to FIGS. 23 and 24. In the description below, components similar to the components of the first embodiment are designated the same reference numbers, and the description is omitted. In the following, the feature point of the embodiment will be described in detail.

The feature point of the embodiment is in that a reinforcing plate is inserted into the erected wall of a foot rest portion.

In a raising material 10 in a hollow double wall structure, a top sidewall 12 on a portion at which the driver's left foot is positioned is deeply molded, and a foot rest 66 is formed integrally with the top sidewall 12. Therefore, the foot rest 66 protrudes as a tilted foot rest surface 70 in a shape protruding from the top sidewall 12 to the vehicle front side.

Next, referring to FIGS. 23 and 24, a joining portion 74 between the foot rest surface 70 of the foot rest 66 and an erected wall 72 which is the right side surface of the foot rest surface 70 is a portion that tends to most reduce the wall thickness of a molten parison in blow molding because of an acute rising shape. This is caused due to an increase in the blow ratio of the joining portion 74. Therefore, in the embodiment, an insertion plate 76 bent along the joining portion 74 is integrally welded to the raising material 10 across the foot rest surface 70 and the erected wall 72. It is noted that for the insertion plate 76, the same type of a resin used for molding the raising material 10 is used among various resins described above. Moreover, the surface of the insertion plate 76 welded to the foot rest surface 70 and the erected wall 72 is a rough surface. The rough surface is formed so as to increase the contact surface area of the welded portion, to engage with the raising material 10 including irregular portions, or to increase the contact surface area of the welded portion and engage with the raising material 10 including irregular portions. Therefore, the joining strength to a welded portion 78 is improved on the rough surface.

Now again referring to FIG. 23, the raising material 10 includes a duct portion 22, which is the air channel of an air conditioner, formed integrally with a raising material 100. A reinforcing rib 15 in a recessed groove is formed on the top surface of the duct portion 22 along the direction of air flowing in the duct. Moreover, a long groove 22a as a partition is formed on both sides of the duct portion 22 to hermetically isolate the duct portion 22. The long groove 22a is a portion at which the top sidewall 12 is welded to a back sidewall 14. The air of the air conditioner is introduced from an air intake port 42, guided to an air outlet port 44, and delivered to a rear seat (not depicted), for example. It is noted that 80 denotes a burr, 82 denotes a cut position, and 84 denotes a diverting wall.

In accordance with the foot rest integrated raising material 10 according to the present invention in the configuration as described above, the thickness of the joining portion 74 between the foot rest surface 70 and the erected wall 72 of the foot rest 66 tends to be most decreased because the blow ratio is increased when blow-molding the raising material 10 including the foot rest 66. The bent insertion plate 76 is disposed across the foot rest surface 70 and the erected wall 72 in order to reinforce the thin joining portion 74. Thus, the strength of the foot rest integrated raising material can be improved by blow molding to some extent of a practical use.

It is noted that for example, in the embodiment, the insertion plate 76 bent along the joining portion 74 is integrally welded to the raising material 10 across the foot rest surface 70 and the erected wall 72. However, the insertion plate 76 may be disposed on the side surface on the opposite side. Alternatively, the insertion plate 76 may be disposed on both side surfaces across the foot rest surface 70.

Moreover, in order to obtain such an effect, such a configuration may be possible as an exemplary modification in which the bent insertion plate is integrally welded to the top sidewall across the foot rest surface and the opposite side surface of the erected wall forming the side surface of the foot rest surface. Furthermore, such a configuration may be possible in which the bent insertion plate is integrally welded to the top sidewall across the foot rest surface and two erected walls forming the side surfaces on both sides of the foot rest surface.

As described above, the embodiments of the present invention are described in detail. A person skilled in the art can variously conceive modifications or alterations within the scope not deviating from the scope of the present invention.

In the embodiments, the case is described where the duct-integrated floor-raising material 10 is disposed on the foot of the driver seat S of the automobile V. However, the invention is not limited thereto. For example, the duct-integrated floor-raising material 10 may be disposed on the foot of the auxiliary sestet or the rear seat of the automobile V as long as the duct-integrated floor-raising material 10 is used for adjusting the height of the floor surface.

Moreover, in the embodiments, the duct-integrated floor-raising material 10 is described in the case where the duct portion 22 is across the adjacent side surfaces of the raising material 10 in the vehicle longitudinal direction. However, the intention is not limited thereto. Such a configuration may be possible in which the route of the duct portion 22 is laid on the position at which the floor-raising material 10 is disposed and the duct portion 22 is integrally molded. For example, the duct portion 22 may be across the opposite side surfaces of the raising material 10 in the vehicle longitudinal direction.

Furthermore, in the embodiments, the case is described on the first long groove 23 and the second long groove 24 partitioning the duct portion 22 from the hollow portion of the duct-integrated floor-raising material 10 where the first long groove 23 and the second long groove 24 inwardly protrude from the back sidewall 14 and the tip end portions of the first long groove 23 and the second long groove 24 are welded to the tip end portions of the recessed grooves 34 inwardly protruding from the top sidewall 12 in the raising material 10. However, the invention is not limited thereto. The first long groove 23 and the second long groove 24 may be disposed on the top sidewall 12 side, on one hand, and the recessed groove 34 may be disposed on the back sidewall 14 side, on the other hand. In addition, in some cases, the height necessary to raise the floor-raising material 10 is not high so much, the blow ratio between the top sidewall 12 and the back sidewall 14 is not increased so much, and a reduction in the thickness of the two walls is not cause a problem in blow molding. In this case, the recessed groove 34 may be omitted, and the tip end of the first long groove 23 or the second long groove 24, which is disposed on the back sidewall 14 or the top sidewall 12, may be directly welded to the inner surface 32 of the top sidewall 12 or the back sidewall 14.

Moreover, in the embodiments, the case is described where the waste bag is cut before opining the split molds 106. In some cases, the waste bag may be cut after opining the split molds 106.

Furthermore, in the embodiments, the case is described where the first long groove 23 and the second long groove 24 are disposed on the back sidewall 14 and the reinforcing ribs 200, 202 and 204 are disposed on the back sidewall 14 side. However, the first long groove 23 and the second long groove 24 may be disposed on the top surface side 12 side. Particularly, in the case where the raising height is low and the blow ratio is not so high, the stiffness of the raising material can be secured, and it is unlikely to produce a fold. Thus, only the reinforcing rib 200 in a simple structure may be adopted among the reinforcing ribs 200, 202 and 204.

BRIEF DESCRIPTION OF THE DRAWINGS

FIG. 7 is a partial cross-sectional view of a communicating passage 50 disposed on a first long groove 23 in a molding apparatus 100 for a duct-integrated raising member of according to a second embodiment of the present invention.

REFERENCE SIGNS LIST

Figure 1:
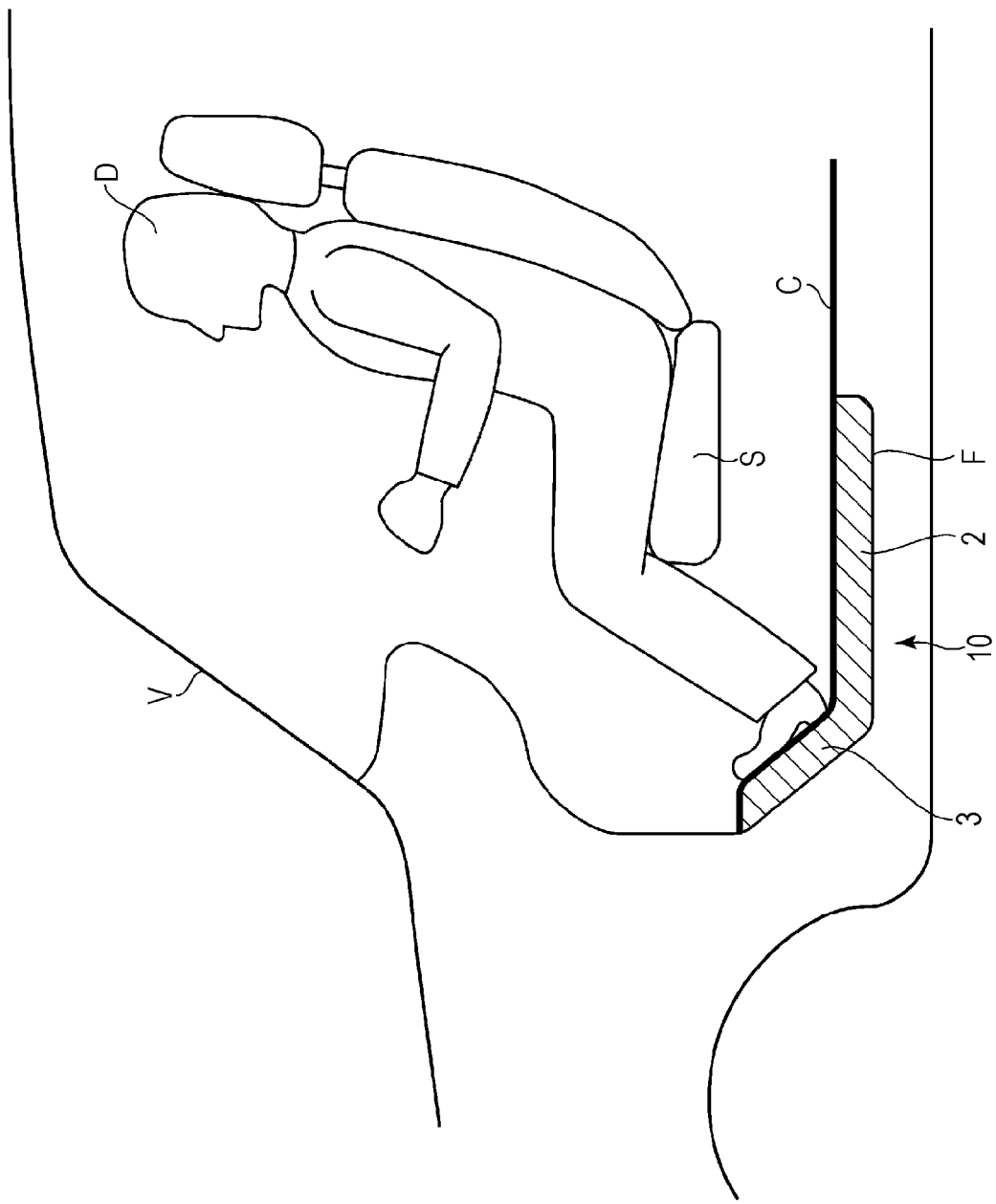
FIG. 1 is a schematic diagram illustrating the situations that a duct-integrated raising member according to a first embodiment of the present invention is disposed on the foot of the driver seat of an automobile V.
Figure 2:
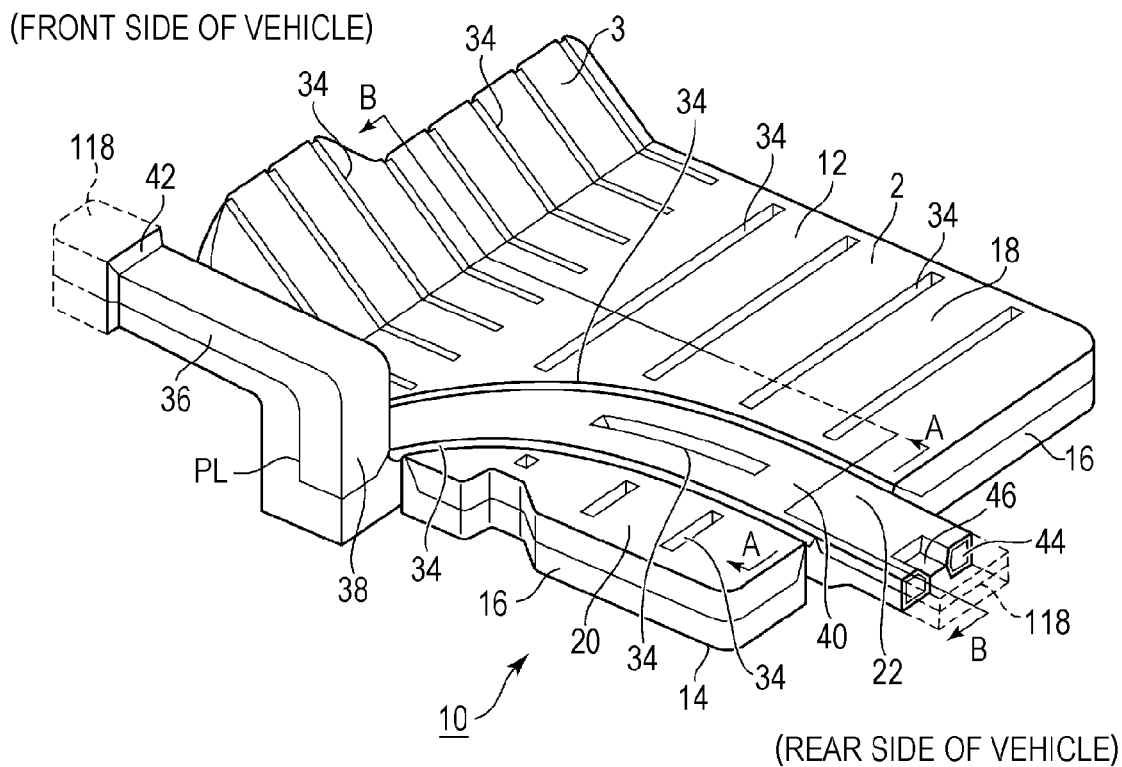
FIG. 2 is a perspective view of the duct-integrated raising member according to the first embodiment of the present invention.
Figure 3:
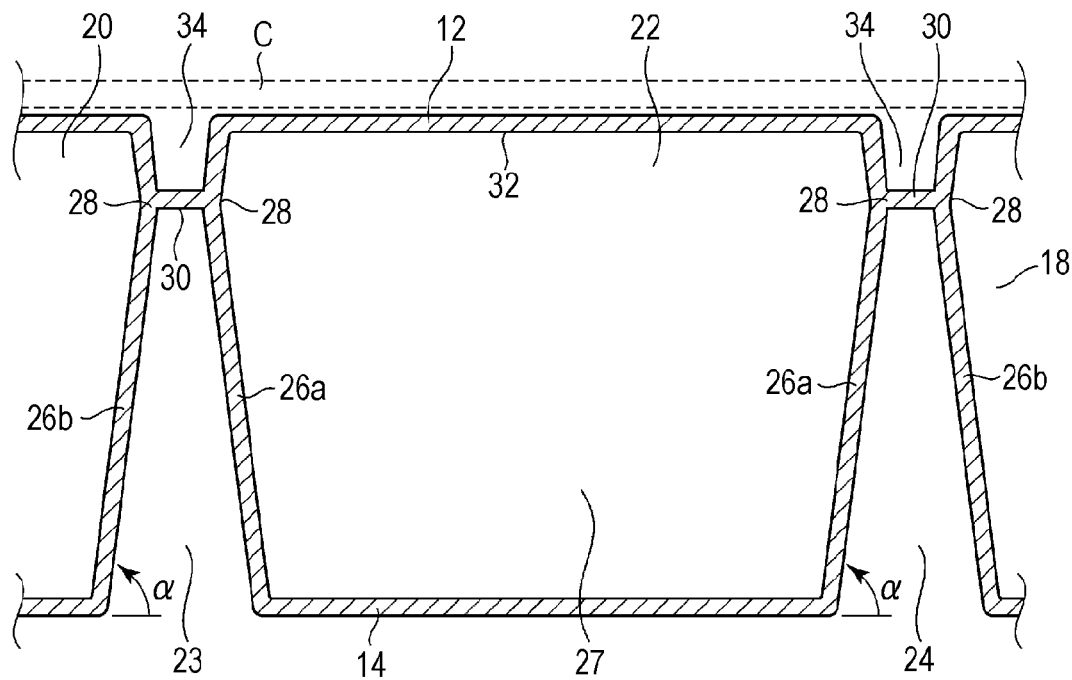
FIG. 3 is a cross-sectional view along the line A-A in FIG. 2.
Figure 4:
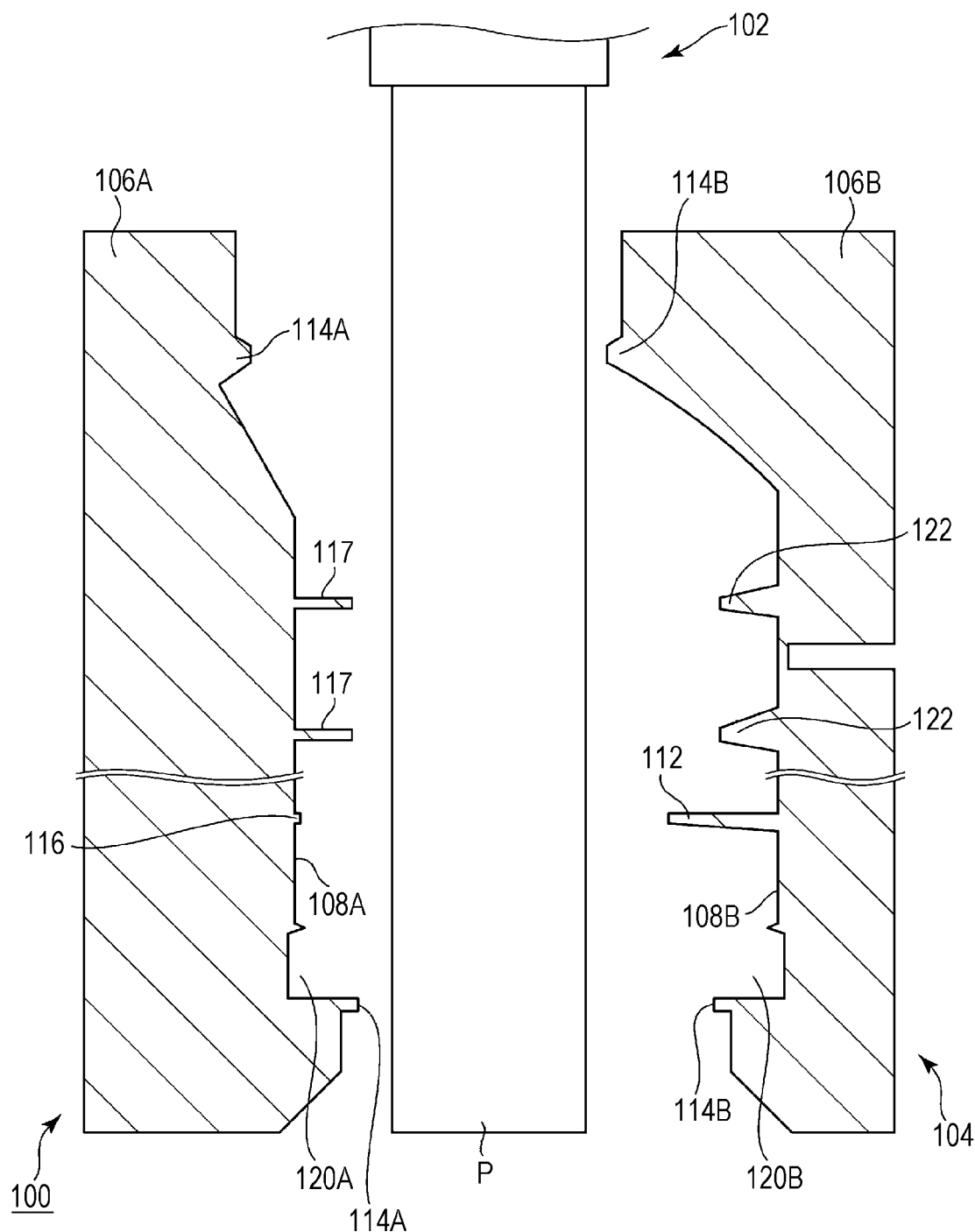
FIG. 4 is a schematic diagram illustrating the situations that a tubular parison P is disposed between a pair of split molds 106A and 106B in a molding apparatus 100 for the duct-integrated raising member according to the first embodiment of the present invention.
Figure 5:
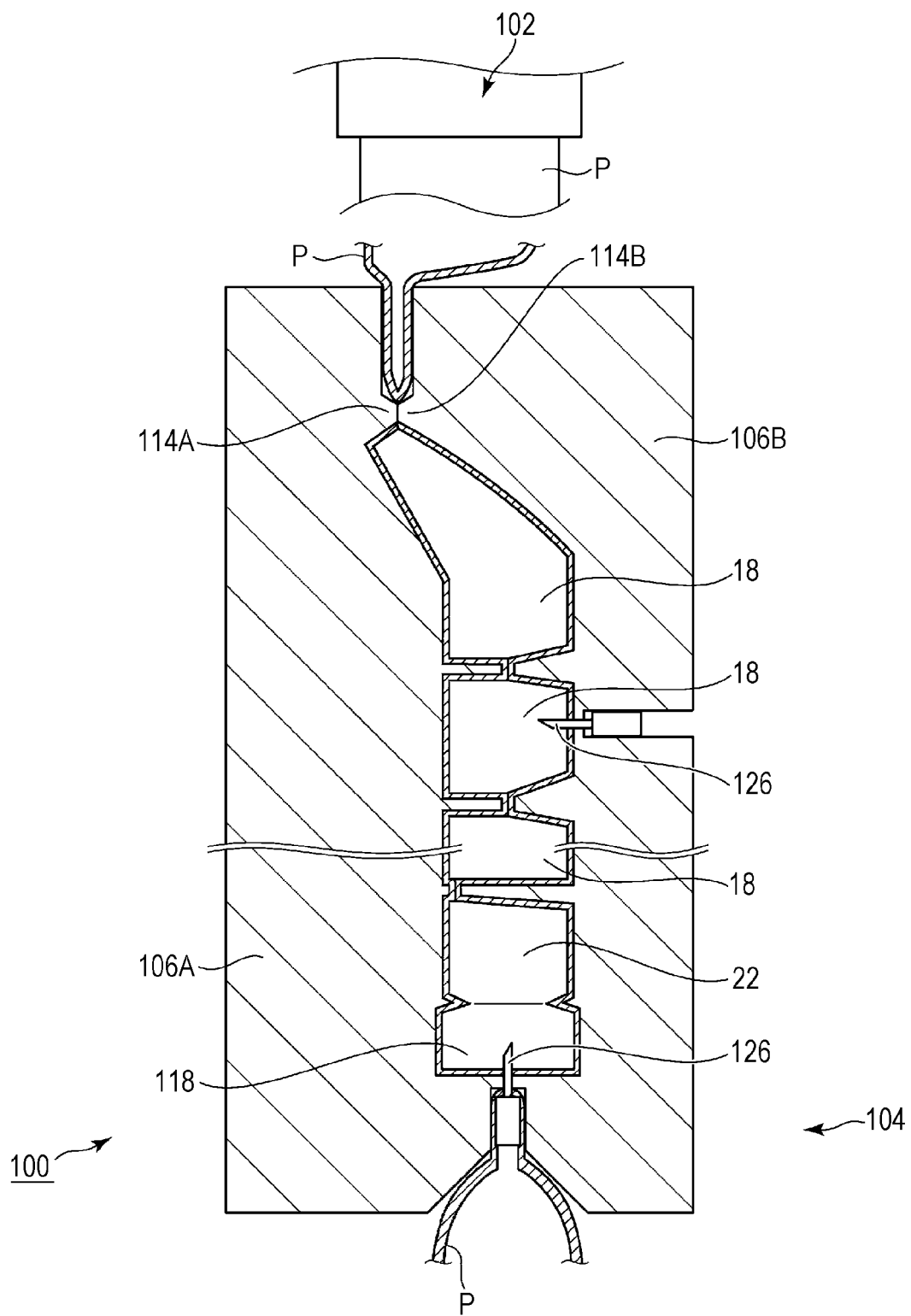
FIG. 5 is a schematic diagram illustrating the situations that the pair of the split molds 106A and 106B is clamped in the molding apparatus 100 for the duct-integrated raising member according to the first embodiment of the present invention.
Figure 6:
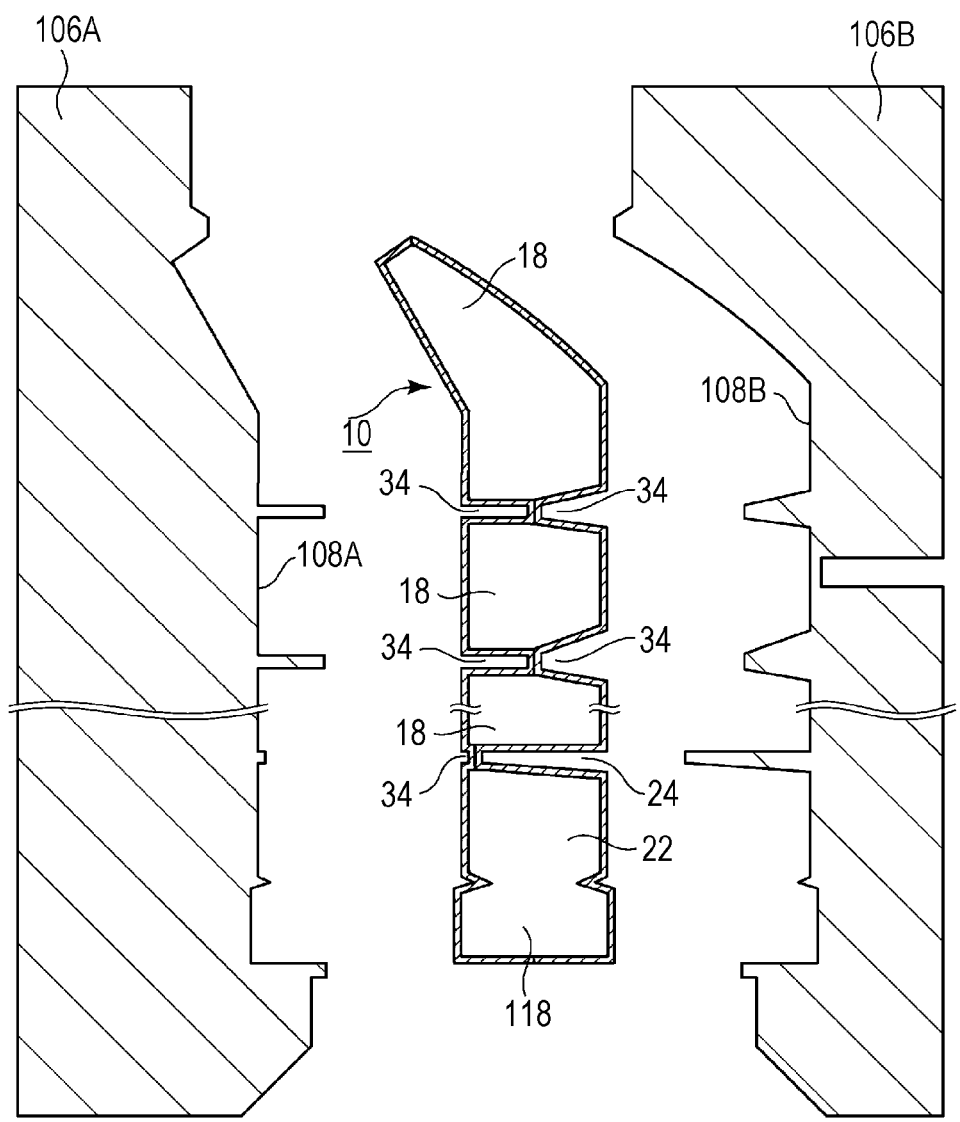
FIG. 6 is a schematic diagram illustrating the situations that the pair of the split molds 106A and 106B is opened in the molding apparatus 100 for the duct-integrated raising member according to the first embodiment of the present invention.
Figure 8:
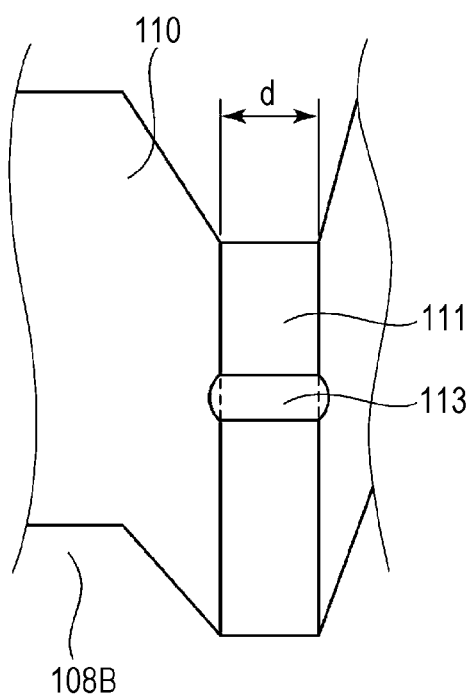
FIG. 8 is a partial perspective view of the detail of a recess 113 disposed on a tip end portion 111 of a first projecting portion 110 in the molding apparatus 100 for the duct-integrated raising member of according to the second embodiment of the present invention.
Figure 9:
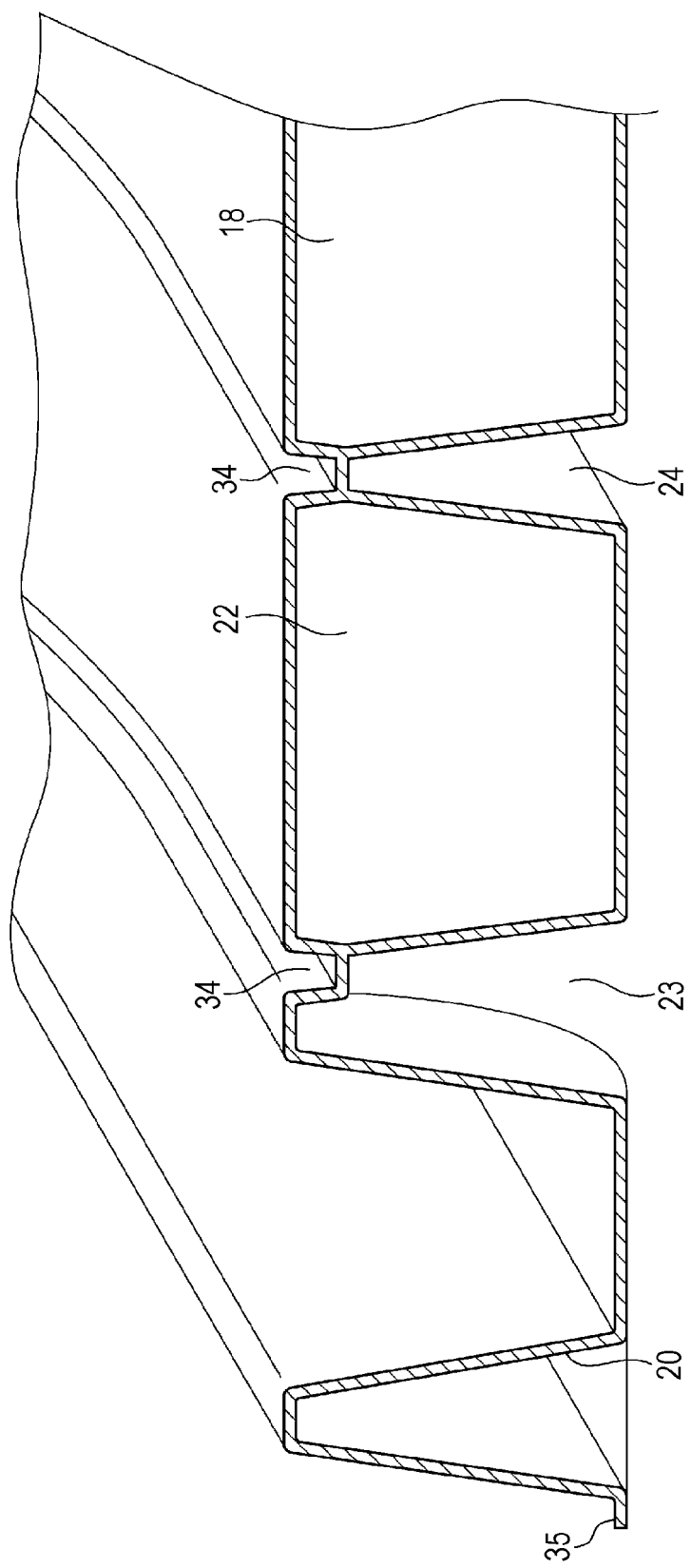
FIG. 9 is a cross-sectional view along the line K-K in FIG. 25.
Figure 10:
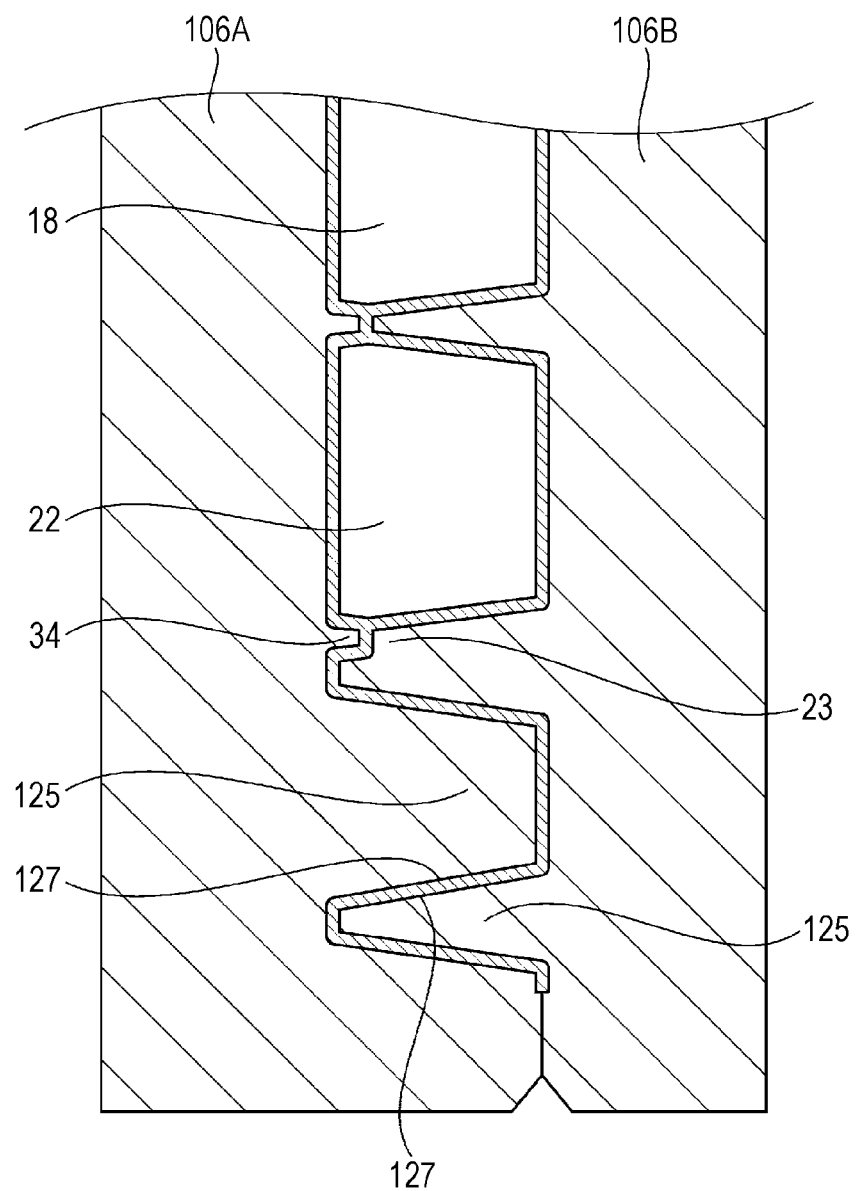
FIG. 10 is a schematic cross-sectional view of the portion around a cavity for mounding the solid wave portion of a duct-integrated raising member in a molding apparatus 100 for the duct-integrated raising member according to a third embodiment of the present invention.
Figure 11:
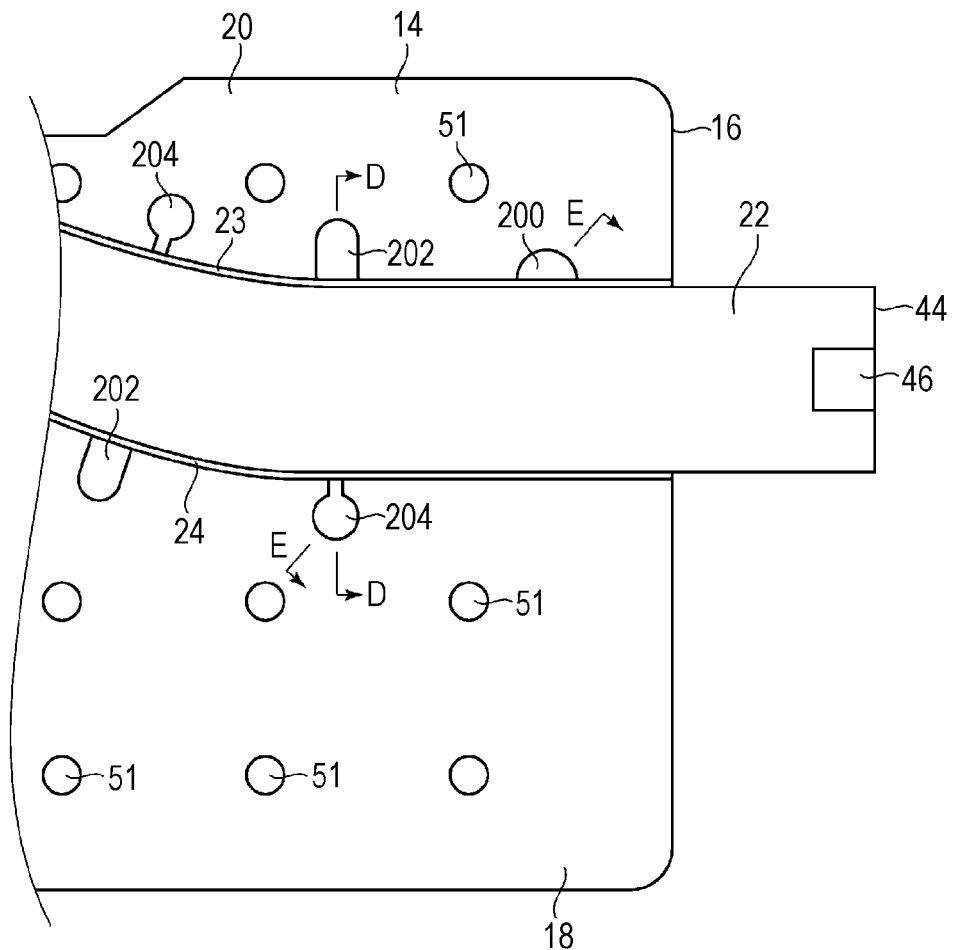
FIG. 11 is a partial bottom diagram illustrating a duct-integrated raising member according to a fourth embodiment of the present invention.
Figure 12:
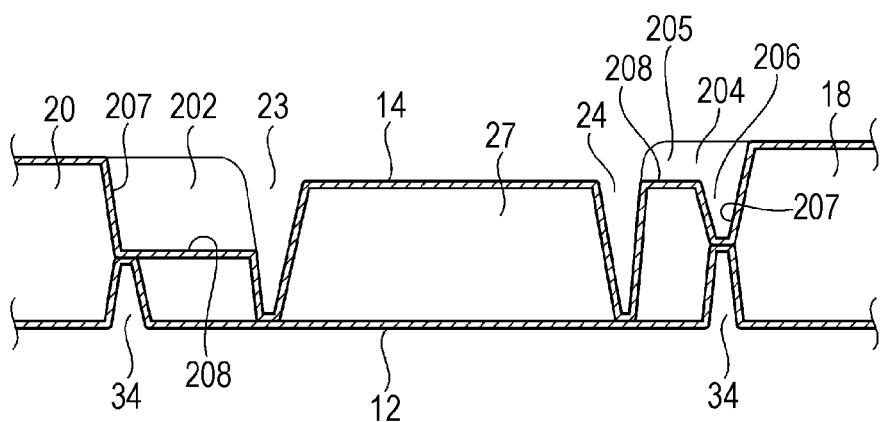
FIG. 12 is a cross-sectional view along the line D-D in FIG. 11.
Figure 13:
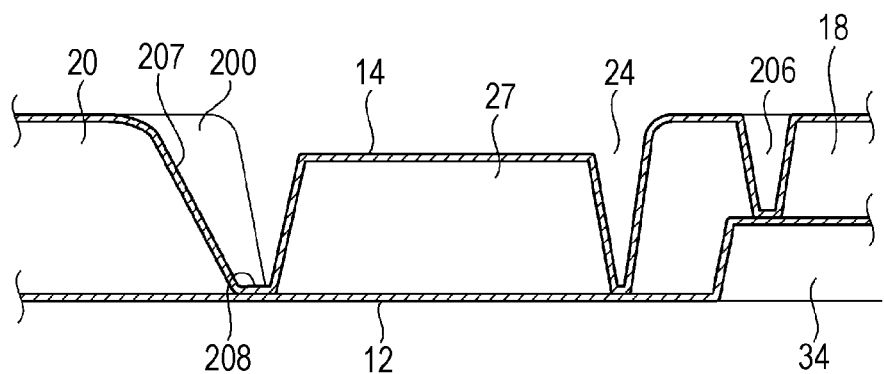
FIG. 13 is a cross-sectional view along the line E-E in FIG. 11.
Figure 14:
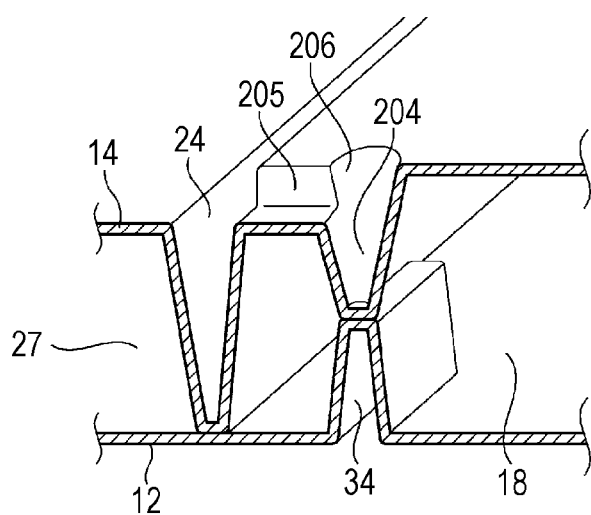
FIG. 14 is a partial cross-sectional view of a portion around a reinforcing rib 204.
Figure 15:
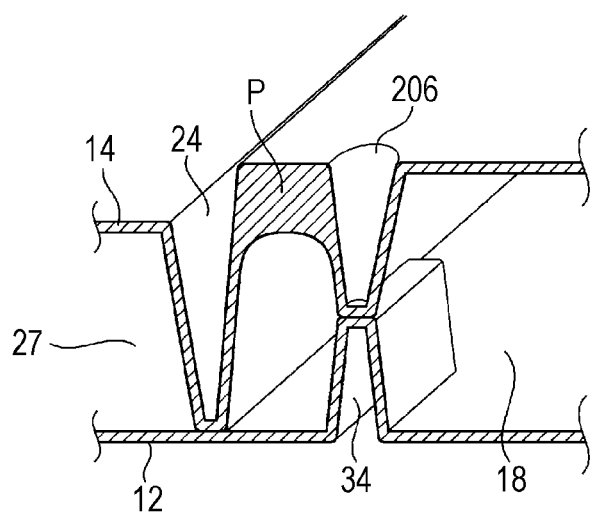
FIG. 15 is a diagram similar to FIG. 7 in the case where a shallow groove is not disposed on a reinforcing rib 204.
Figure 16:
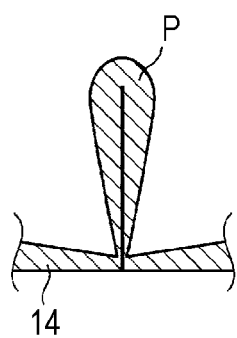
FIG. 16 is a schematic diagram illustrative of the occurrence of a fold P.
Figure 17:
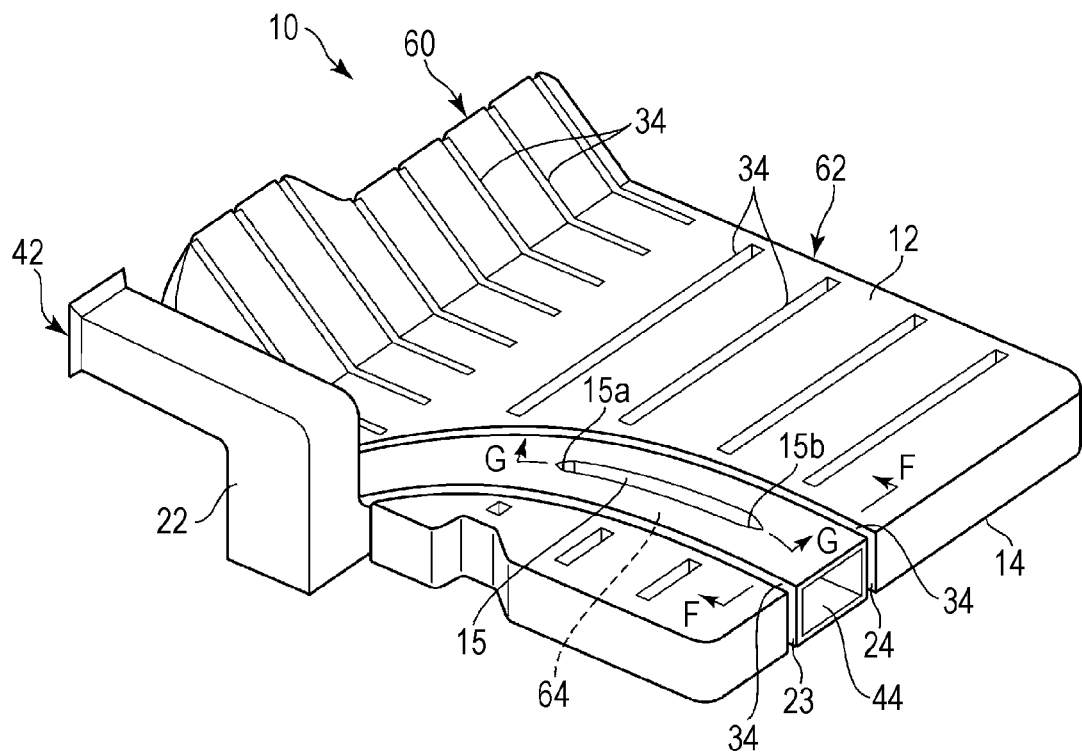
FIG. 17 is an overall perspective view of a vehicle raising material according to a fifth embodiment to a seventh embodiment of the present invention.
Figure 18:
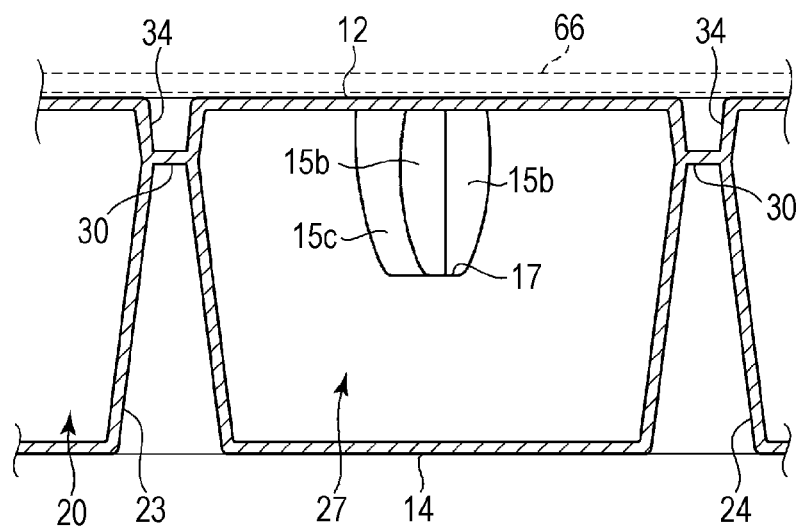
FIG. 18 is a cross-sectional view along the line F-F in FIG. 17.
Figure 19:
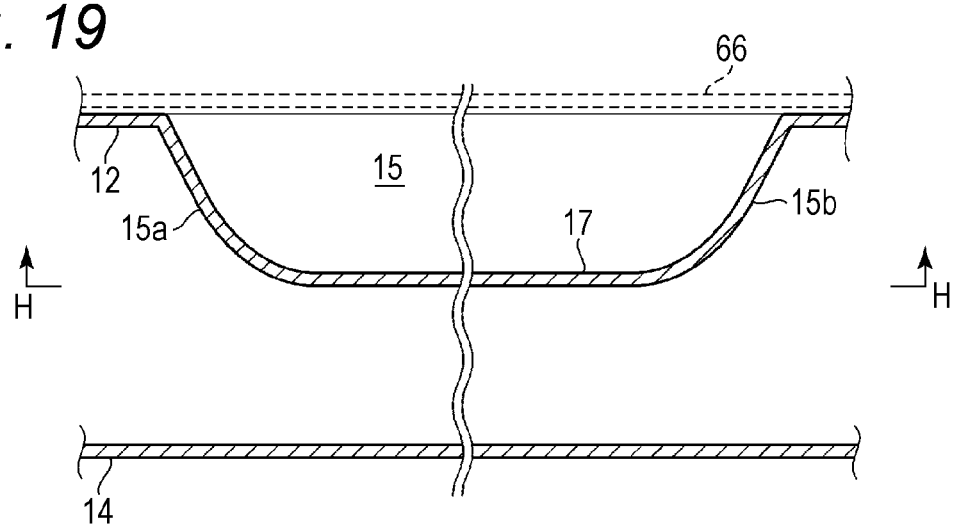
FIG. 19 is a cross-sectional view along the line G-G in FIG. 17.
Figure 20:
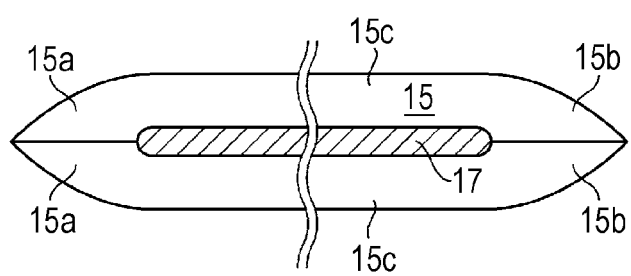
FIG. 20 is a cross-sectional view along the line H-H in FIG. 19.
Figure 21:
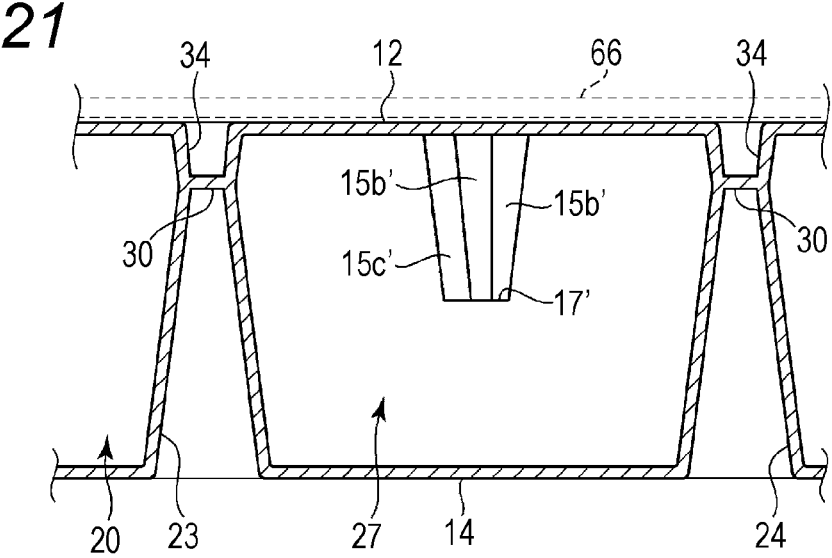
FIG. 21 is a cross-sectional view along the line F-F in FIG. 17, showing the sixth embodiment.
Figure 22:
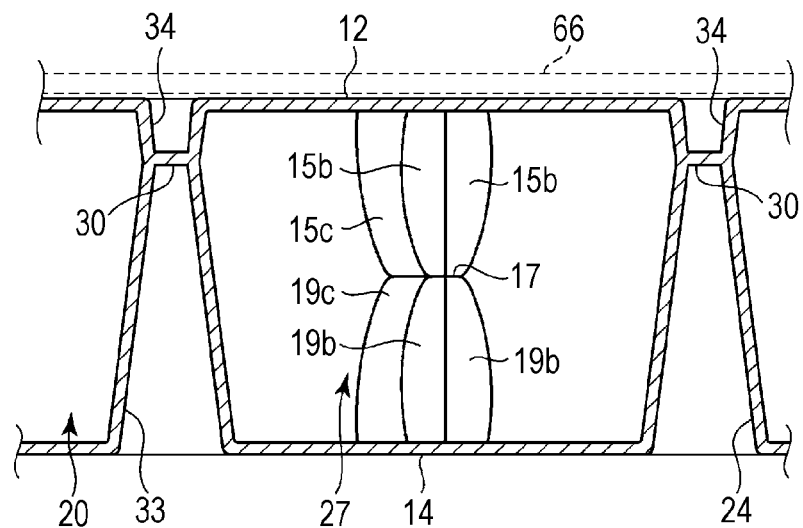
FIG. 22 is a cross-sectional view along the line F-F in FIG. 17, showing the seventh embodiment.
Figure 23:
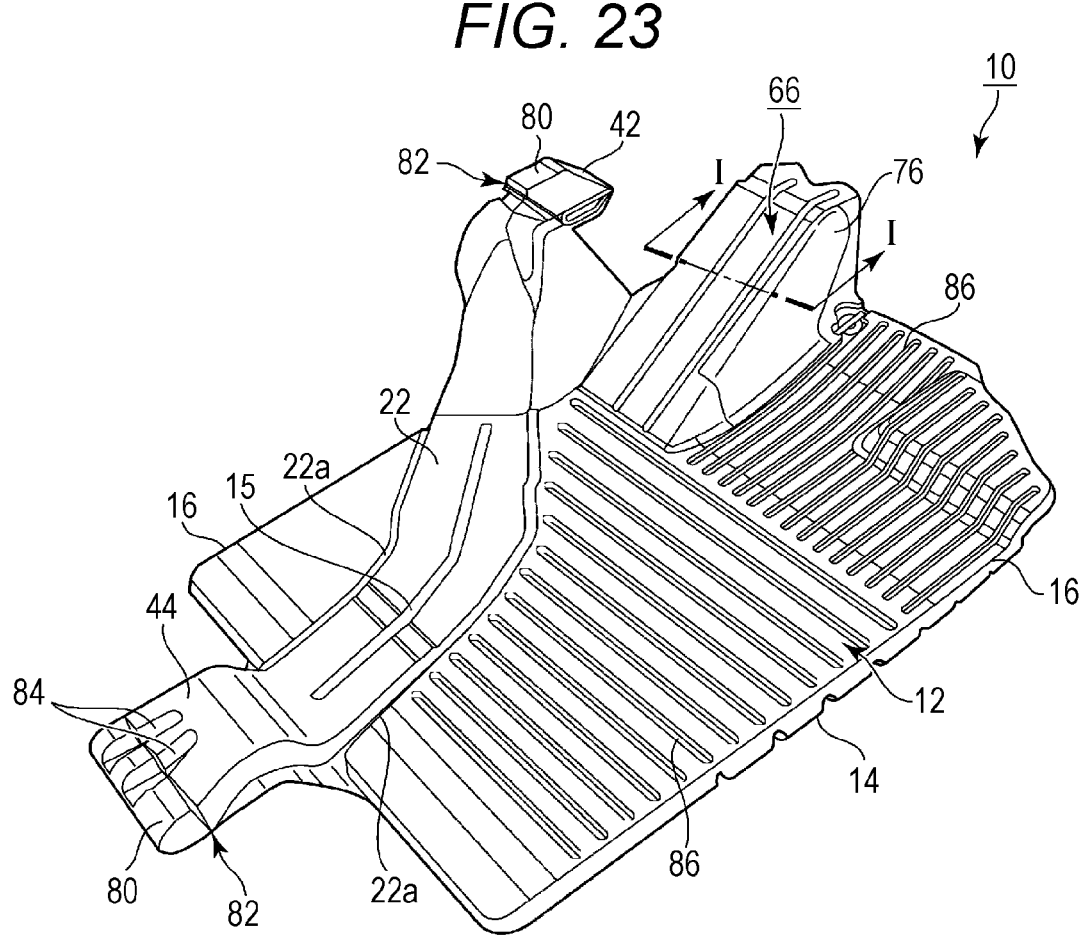
FIG. 23 is a perspective view of molded components of a foot rest integrated raising material according to an eighth embodiment of the present invention.
Figure 24:
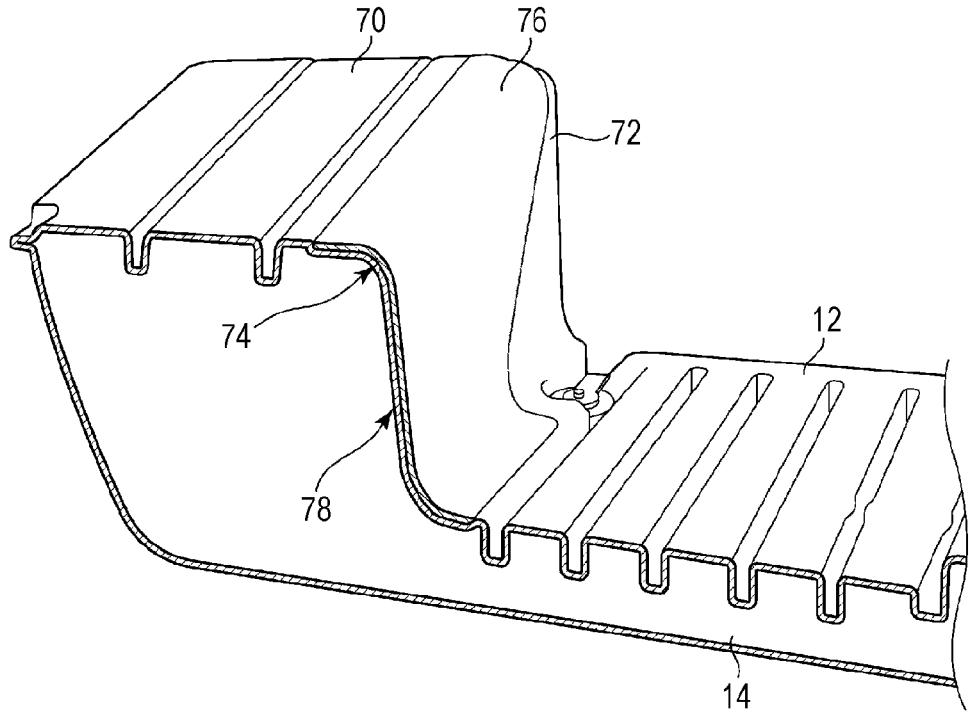
FIG. 24 is a cross-sectional view of a cross section along the line I-I in FIG. 23.
Figure 25:
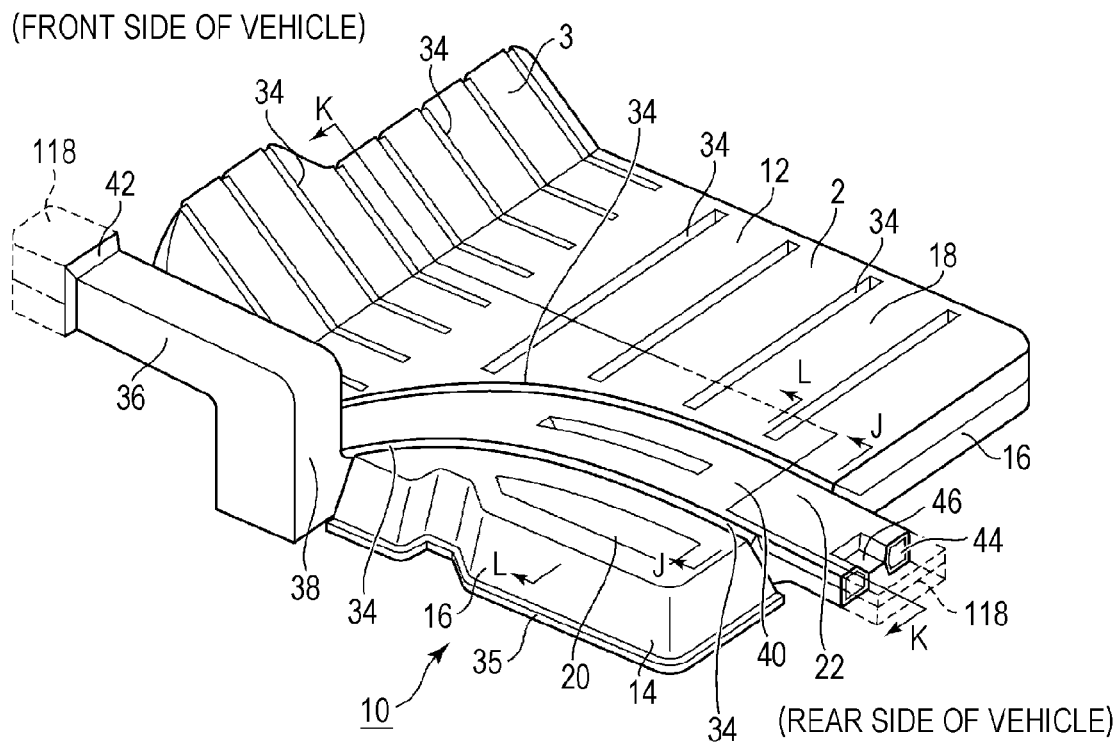
FIG. 25 is a perspective view of the duct-integrated raising member according to the third embodiment of the present invention.
Figure 26:
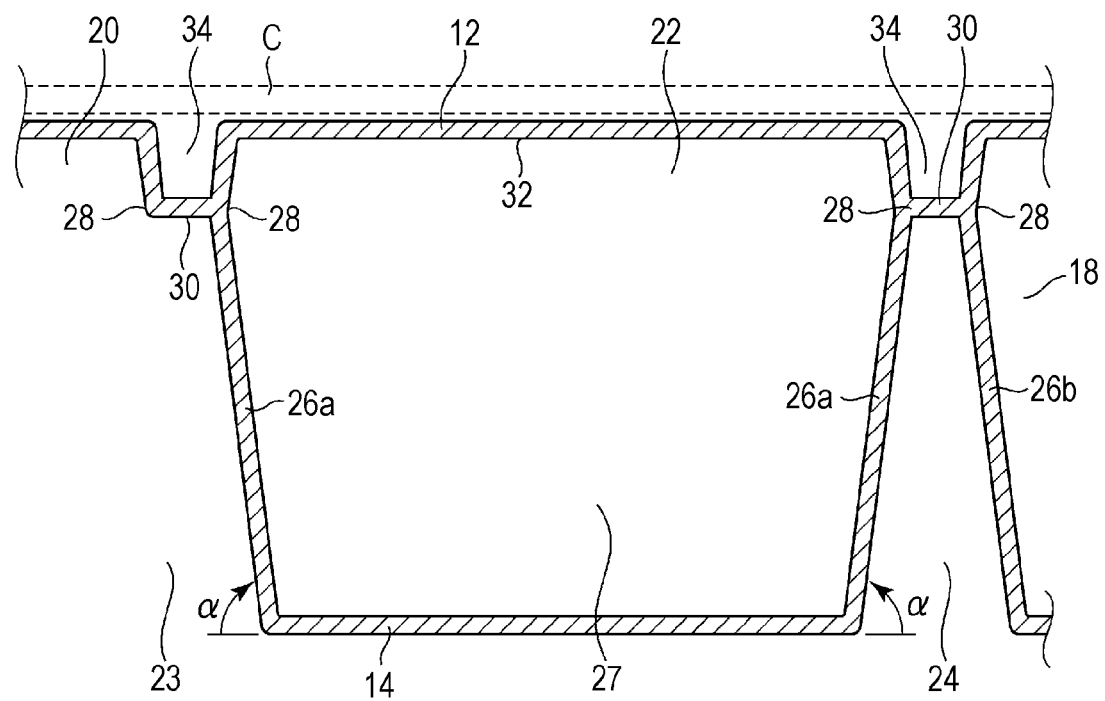
FIG. 26 is a cross-sectional view along the line J-J in FIG. 25.

V Automobile
C Carpet
F Floor pan
S Driver seat
D Driver
P Tubular parison
PL Parting line
P Fold
10 Duct-integrated raising member
12 Top sidewall
14 Back sidewall
15 Top sidewall side long groove
15a Upstream side tapered portion
15b Downstream side tapered portion
15c Long groove main body
16 Peripheral sidewall
17 Welded portion
18 Large hollow portion
19 Back sidewall side long groove
19a Upstream side tapered portion
19b Downstream side tapered portion
19c Long groove main body
20 mall hollow portion
22 Duct portion
23 First long groove
24 Second long groove
26 Opposite sidewall
28 Lower edge
30 Bottom wall
32 Inner surface
34 Recessed groove
36 Horizontal straight portion
38 Vertical portion
40 Horizontal curved portion
42 Air intake port
44 Air outlet port
50 Communicating passage
60 Foot rest
62 Raising portion
64 Air channel
66 Carpet
70 Foot rest surface
72 Erected wall
74 Joining portion
76 Insertion plate
78 Welded portion
80 Burr
82 Cut position
84 Diverting wall
100 Molding apparatus
102 Extruding device
104 Clamping device 106 Split mold
108 Cavity
110 First projecting portion
112 Second projecting portion
113 Recess
114 Pinch-off portion
116 Third projecting portion
117 Protrusion
118 Waste bag
120 Recess
122 Protrusion
126 Blow pin
200 Reinforcing rib
202 Reinforcing rib
204 Reinforcing rib
205 Shallow groove
206 Truncated cone rib
207 Peripheral side surface
208 Bottom face

The invention claimed is:

1. A method for producing a duct-integrated floor-raising material in a hollow double wall structure in which a height between a top sidewall and a back sidewall is used for raising a floor and a first hollow portion, a second hollow portion, and a duct portion disposed between the hollow portions are disposed as partitioned from each other, the method comprising the steps of:
   preparing a pair of split molds individually disposed with a pinch-off portion around cavities of the split molds, the split molds being disposed as the cavities are opposite to each other, the split molds being relatively movable between a clamping position and an opening position, at least one of the cavities of the split molds being disposed, between the pinch-off portions, with a first projecting portion to form a first long groove protruding inwardly and partitioning the first hollow portion from the duct portion on a back sidewall of the floor-raising material and a second projecting portion to form a second long groove protruding inwardly and partitioning the second hollow portion from the duct portion on the back sidewall of the floor-raising material, at least one of the cavities of the molds being disposed with a recess to form a waste bag in communication with the duct portion on an outer side of the cavity corresponding to an end portion of the duct portion;
   disposing a molten tubular parison between the pair of the split molds at the opening position;
   forming a first enclosed space corresponding to the first hollow portion, a second enclosed space corresponding to the second hollow portion, and a third enclosed space corresponding to the duct portion and the waste bag in which the pair of the split molds at the opening position is relatively brought close to the clamping position, the pair of the split molds is moved to the clamping position so that tip end portions of the first projecting portion and the second projecting portion of one mold face the cavity of the other mold and are brought close to each other at a predetermined distance, the molten tubular parison is pressed flat and extruded from the pinch-off portions, and portions of the molten tubular parison corresponding to the pinch-off portions of the pair of the molds is welded to each other;
   molding the first hollow portion, the second hollow portion, the duct portion, and the waste bag in which a blow pin is individually pierced to outer surfaces of the tubular parison corresponding to the first enclosed space, the second enclosed space, and the waste bag, a pressurized fluid is blown to expand the molten tubular parison, the expanded molten tubular parison is pressed against surfaces of the cavities of the corresponding split molds, and the tubular parison is shaped; and
   cutting the waste bag to form an air intake port or an air outlet port on the duct portion with no mark of a blow pin on the duct portion.

2. The method for producing a duct-integrated raising material according to claim 1, wherein:
   a waste bag is formed on end portions of the duct portion; and
   a blow pin is pierced to the waste bags, and a pressurized fluid is blown into the third enclosed space corresponding to the duct portion.

3. The method for producing a duct-integrated raising material according to claim 2, wherein a blow pin is pierced to a portion of the waste bag corresponding to the pinch-off portion in clamping the integrated split molds.

4. The method for producing a duct-integrated raising material according to claim 1, wherein:
   the duct-integrated floor-raising material is provided with a third projecting portion disposed on the top sidewall of the cavity of the split mold opposite to at least one of the split molds, and the third projecting portion forms a groove rib protruding from the top sidewall to the hollow portion side; and
   bottom walls of the first long groove and the second long groove are welded to an inner surface of a bottom portion of the groove rib.

5. The method for producing a duct-integrated raising material according to claim 1, wherein:
   the step of disposing the in molten parison includes the step of extruding the molten parison from an extrusion slit disposed above the pair of the split molds;
   the first projecting portion and the second projecting portion are disposed across the pinch-off portions in a nearly vertical direction on at least the one of the cavities of the split molds, and the duct portion is molded in an orientation in a nearly vertical direction; and
   a blow pin to the waste bag below is pierced upwardly or horizontally, and a blow pin to the waste bag above is pierced horizontally.

6. The method for producing a duct-integrated raising material according to claim 5, wherein a blow pin to the hollow portion is pierced horizontally from an inside of a corresponding mold in an orientation nearly orthogonal to a surface of the cavity.

7. A method for producing a duct-integrated floor-raising material in a hollow double wall structure in which a height between a top sidewall and a back sidewall is used for raising a floor, a small hollow portion, a large hollow portion, and a duct portion between the hollow portions are disposed, the duct portion is in communication with the small hollow portion using a communicating passage, and the duct portion is partitioned from the large hollow portion, the method comprising the steps of:
   preparing a pair of split molds individually disposed with a pinch-off portion around cavities of the split molds, the split molds being disposed as the cavities are opposite to each other, the split molds being relatively movable between a clamping position and an opening position, at least one of the cavities of the split molds being disposed, between the pinch-off portions, with a first projecting portion to form a first long groove protruding inwardly and partitioning the small hollow portion from the duct portion on a back sidewall of the floor-raising material and a second projecting portion to form a second long groove protruding inwardly and partitioning the large hollow portion from the duct portion on the back sidewall of the floor-raising material, a tip end portion of the first projecting portion being disposed with a recess to form the communicating passage in a thickness direction of the first projecting portion, at least one of the cavities of the molds being disposed with a recess to form a waste bag in communication with the duct portion on an outer side of the cavity corresponding to an end portion of the duct portion;

disposing a molten tubular parison between the pair of the split molds at the opening position;

forming a second enclosed space corresponding to the large hollow portion, a third enclosed space corresponding to the duct portion and the waste bag, and a first enclosed space corresponding to the small hollow portion in communication with the third enclosed space and the recess in which the pair of the split molds at the opening position is relatively brought close to the clamping position, the pair of the split molds is moved to the clamping position so that tip end portions of the first projecting portion and the second projecting portion of one mold face the cavity of the other mold and are brought close to each other at a predetermined distance, the molten tubular parison is pressed flat and extruded from the pinch-off portions, and portions of the molten tubular parison corresponding to the pinch-off portions of the pair of the molds is welded to each other;

molding the large hollow portion, the duct portion, and the waste bag and molding the small hollow portion through the communicating passage in which a blow pin is individually pierced to outer surfaces of the tubular parison corresponding to the second enclosed space and the waste bag, a pressurized fluid is blown to expand the molten tubular parison, the expanded molten tubular parison is pressed against surfaces of the cavities of the corresponding split molds, and the tubular parison is shaped; and cutting the waste bag to form an air intake port or an air outlet port on the duct portion with no mark of a blow pin on the duct portion.

8. The method for producing a duct-integrated raising material according to claim 7, wherein:

a waste bag is formed on end portions of the duct portion; and a blow pin is pierced to the waste bags, and a pressurized fluid is blown into the third enclosed space corresponding to the duct portion.

9. The method for producing a duct-integrated raising material according to claim 8, wherein a blow pin is pierced to a portion of the waste bag corresponding to the pinch-off portion in clamping the integrated split molds.

10. The method for producing a duct-integrated raising material according to claim 7, wherein:

the duct-integrated floor-raising material is provided with a third projecting portion disposed on the top sidewall of the cavity of the split mold opposite to at least one of the split molds, and the third projecting portion forms a groove rib protruding from the top sidewall to the hollow portion side; and bottom walls of the first long groove and the second long groove are welded to an inner surface of a bottom portion of the groove rib.

11. The method for producing a duct-integrated raising material according to claim 7, wherein:

the step of disposing the in molten parison includes the step of extruding the molten parison from an extrusion slit disposed above the pair of the split molds;

the first projecting portion and the second projecting portion are disposed across the pinch-off portions in a nearly vertical direction on at least the one of the cavities of the split molds, and the duct portion is molded in an orientation in a nearly vertical direction; and a blow pin to the waste bag below is pierced upwardly or horizontally, and a blow pin to the waste bag above is pierced horizontally.

12. The method for producing a duct-integrated raising material according to claim 11, wherein a blow pin to the hollow portion is pierced horizontally from an inside of a corresponding mold in an orientation nearly orthogonal to a surface of the cavity.

13. A method for producing a duct-integrated floor-raising material in a hollow double wall structure in which a height between a top sidewall and a back sidewall is used for raising a floor, a hollow portion and a duct portion are disposed as partitioned from each other, and the duct portion is disposed with a solid wave portion at almost a same level as a level of the hollow portion on an opposite side of the hollow portion on a top sidewall, the method comprising the steps of:

preparing a pair of split molds individually disposed with a pinch-off portion around cavities of the split molds, the split molds being disposed as the cavities are opposite to each other, the split molds being relatively movable between a clamping position and an opening position, at least one of the cavities of the split molds being disposed, between the pinch-off portions, with a first projecting portion to form a first long groove protruding inwardly and partitioning the hollow portion from the duct portion on a back sidewall and a second projecting portion to form a second long groove protruding inwardly and hermetically sealing the duct portion, the pair of the split molds being individually disposed with a protrusion to form the solid wave portion on the duct portion on the opposite side of the hollow portion, the protrusion being in an alternately complementary shape having the second projecting portion as a single protrusion, at least one of the cavities of the molds being disposed with a recess to form a waste bag in communication with the duct portion on an outer side of the cavity corresponding to an end portion of the duct portion;

disposing a molten tubular parison between the pair of the split molds at the opening position;

forming a first enclosed space corresponding to the hollow portion and the waste bag in which the pair of the split molds at the opening position is relatively brought close to the clamping position, the pair of the split molds is moved to the clamping position so that a tip end portion of the first projecting portion of one mold faces the cavity of the other mold and is brought close to the cavity of the other mold at a predetermined distance, the molten tubular parison is pressed flat and extruded from the pinch-off portions, and two wall surfaces of the tubular parison are integrally welded to each other by clamping the molten tubular parison between the pair of the split molds while welding portions of the molten tubular parison corresponding to the pinch-off portions of the pair of the molds to each other to avoid formation of a substantial hollow portion on the solid wave portion;

molding the hollow portion, the duct portion, and the waste bag in which a blow pin is individually pierced to outer surfaces of the tubular parison corresponding to the first enclosed space and the waste bag, a pressurized fluid is blown to expand the molten tubular parison, the expanded molten tubular parison is pressed against surfaces of the cavities of the corresponding split molds, and the tubular parison is shaped; and cutting the waste bag to form an air intake port or an air outlet port on the duct portion with no mark of a blow pin on the duct portion.

14. The method for producing a duct-integrated raising material according to claim 13, wherein:

a waste bag is formed on end portions of the duct portion; and a blow pin is pierced to the waste bags, and a pressurized fluid is blown into the third enclosed space corresponding to the duct portion.

15. The method for producing a duct-integrated raising material according to claim 14, wherein a blow pin is pierced to a portion of the waste bag corresponding to the pinch-off portion in clamping the integrated split molds.

16. The method for producing a duct-integrated raising material according to claim 13, wherein:

the duct-integrated floor-raising material is provided with a third projecting portion disposed on the top sidewall of the cavity of the split mold opposite to at least one of the split molds, and the third projecting portion forms a groove rib protruding from the top sidewall to the hollow portion side; and bottom walls of the first long groove and the second long groove are welded to an inner surface of a bottom portion of the groove rib.

17. The method for producing a duct-integrated raising material according to claim 13, wherein:

the step of disposing the in molten parison includes the step of extruding the molten parison from an extrusion slit disposed above the pair of the split molds;

the first projecting portion and the second projecting portion are disposed across the pinch-off portions in a nearly vertical direction on at least the one of the cavities of the split molds, and the duct portion is molded in an orientation in a nearly vertical direction; and a blow pin to the waste bag below is pierced upwardly or horizontally, and a blow pin to the waste bag above is pierced horizontally.

18. The method for producing a duct-integrated raising material according to claim 17, wherein a blow pin to the hollow portion is pierced horizontally from an inside of a corresponding mold in an orientation nearly orthogonal to a surface of the cavity.

* * * * *